US 9,846,415 B2

(12) United States Patent
Choo et al.

(10) Patent No.: US 9,846,415 B2
(45) Date of Patent: Dec. 19, 2017

(54) EFFICIENT TRANSFER OF MATERIALS USING AUTOMATED GUIDED VEHICLES IN SEMICONDUCTOR MANUFACTURING

(71) Applicant: GLOBALFOUNDRIES Singapore Pte. Ltd., Singapore (SG)

(72) Inventors: Weng Cheong Choo, Singapore (SG); Vei Tzee @ Kelvin Bui, Singapore (SG); Yuanfeng Zhang, Singapore (SG); Ting Lik Edmund Tan, Singapore (SG); Chee Wai Leong, Singapore (SG); Jong Youn Hwang, Singapore (SG); Shin Yit Lee, Singapore (SG); Wee Jin Tey, Singapore (SG); Kah Hing Ting, Singapore (SG); Ai Ling Nancy Chua, Singapore (SG)

(73) Assignee: GLOBALFOUNDRIES SINGAPORE PTE. LTD., Singapore (SG)

( * ) Notice: Subject to any disclaimer, the term of this patent is extended or adjusted under 35 U.S.C. 154(b) by 644 days.

(21) Appl. No.: 13/746,280

(22) Filed: Jan. 21, 2013

(65) Prior Publication Data

US 2013/0190915 A1    Jul. 25, 2013

Related U.S. Application Data

(60) Provisional application No. 61/588,641, filed on Jan. 19, 2012.

(51) Int. Cl.
G05B 11/01    (2006.01)
G05B 19/418   (2006.01)

(52) U.S. Cl.
CPC .......... *G05B 11/01* (2013.01); *G05B 19/4189* (2013.01); *G05B 2219/31002* (2013.01); *Y02P 90/28* (2015.11); *Y02P 90/285* (2015.11)

(58) Field of Classification Search
None
See application file for complete search history.

(56) References Cited

U.S. PATENT DOCUMENTS 4,625,158 A    11/1986   Taenzer
4,646,648 A    3/1987    Lindbom
(Continued)

FOREIGN PATENT DOCUMENTS

EP    0492791 A2    7/1992
WO    2011115617 A1    9/2011

OTHER PUBLICATIONS

Mark Lapedus, Intel re-spins fab for 300-mm, 65-nm chips, http://www.eetimes.com/showArticle.jhtml?articleID=173401769, Nov. 1, 2005.

*Primary Examiner* — Mohammad Ali
*Assistant Examiner* — Bernard G Lindsay
(74) *Attorney, Agent, or Firm* — Horizon IP PTE Ltd.

(57) ABSTRACT

Methods for manufacturing automation and a computer executed automated handling system for forming a device are presented. The method includes issuing a transfer request by a tool. The transfer request is processed by a production control system configured for tracking and controlling the flow of carriers. The processing of the transfer request includes selecting a carrier containing production material. A transport system having transport and load/unload (U/L) units in a production area to effect a transfer is controlled and the carrier is transferred by the transport system.

17 Claims, 38 Drawing Sheets

(56) References Cited

U.S. PATENT DOCUMENTS

| | | | | |
|---|---|---|---|---|
| 4,698,775 A | * | 10/1987 | Koch | B25J 5/007 414/265 |
| 4,702,668 A | | 10/1987 | Carlisle et al. | |
| 4,746,843 A | | 5/1988 | Taenzer | |
| 4,794,286 A | | 12/1988 | Taenzer | |
| 4,795,306 A | | 1/1989 | Allan et al. | |
| 4,835,730 A | | 5/1989 | Shimano et al. | |
| 4,876,728 A | | 10/1989 | Roth | |
| 5,023,790 A | | 6/1991 | Luke, Jr. | |
| 5,314,293 A | | 5/1994 | Carlisle et al. | |
| 5,687,831 A | | 11/1997 | Carlisle | |
| 5,810,537 A | | 9/1998 | Briner et al. | |
| 6,019,563 A | * | 2/2000 | Murata | B23Q 7/1436 414/222.01 |
| 6,056,108 A | | 5/2000 | Buchi et al. | |
| 6,193,199 B1 | | 2/2001 | Karam, II | |
| 6,346,809 B1 | | 2/2002 | Karam, II | |
| 6,530,734 B2 | | 3/2003 | Nering | |
| 6,622,057 B1 | | 9/2003 | Ko et al. | |
| 6,734,651 B2 | | 5/2004 | Cook et al. | |
| 6,895,301 B2 | | 5/2005 | Mountz | |
| 6,917,893 B2 | | 7/2005 | Dietsch et al. | |
| 6,985,780 B2 | | 1/2006 | Hudson et al. | |
| 6,988,008 B2 | | 1/2006 | Hudson et al. | |
| 7,174,224 B2 | | 2/2007 | Hudson et al. | |
| 7,313,464 B1 | | 12/2007 | Perreault et al. | |
| 7,467,503 B2 | | 12/2008 | Davolio et al. | |
| 7,650,013 B2 | | 1/2010 | Dietsch et al. | |
| 7,693,654 B1 | | 4/2010 | Dietsch et al. | |
| 7,912,633 B1 | | 3/2011 | Dietsch et al. | |
| 7,980,808 B2 | | 7/2011 | Chilson et al. | |
| 2001/0034557 A1 | | 10/2001 | Hudson et al. | |
| 2002/0007229 A1 | | 1/2002 | Hudson et al. | |
| 2002/0128810 A1 | | 9/2002 | Craig et al. | |
| 2003/0012626 A1 | | 1/2003 | Aggarwal | |
| 2003/0180134 A1 | | 9/2003 | Lering | |
| 2004/0091338 A1 | * | 5/2004 | Kim | 414/217 |
| 2004/0093116 A1 | * | 5/2004 | Mountz | G05D 1/0274 700/216 |
| 2004/0111339 A1 | * | 6/2004 | Wehrung et al. | 705/30 |
| 2004/0122570 A1 | | 6/2004 | Sonoyama et al. | |
| 2004/0234362 A1 | * | 11/2004 | Iijima | G05B 19/41865 414/222.1 |
| 2005/0071031 A1 | * | 3/2005 | Lin et al. | 700/101 |
| 2005/0080524 A1 | | 4/2005 | Park | |
| 2006/0104712 A1 | * | 5/2006 | Bufano | H01L 21/67715 404/1 |
| 2007/0027575 A1 | * | 2/2007 | Chae | H01L 21/67276 700/226 |
| 2007/0244594 A1 | * | 10/2007 | Chik et al. | 700/112 |
| 2007/0274813 A1 | | 11/2007 | Rice et al. | |
| 2008/0071411 A1 | * | 3/2008 | Anderson et al. | 700/115 |
| 2008/0121339 A1 | | 5/2008 | Muirhead | |
| 2008/0167817 A1 | | 7/2008 | Hessler et al. | |
| 2008/0183324 A1 | | 7/2008 | Krisnamuthi et al. | |
| 2009/0035102 A1 | * | 2/2009 | Zimmerhackl | H01L 21/67276 414/222.04 |
| 2009/0088894 A1 | | 4/2009 | Tanemori | |
| 2010/0135760 A1 | | 6/2010 | Hjornet | |
| 2011/0015773 A1 | | 1/2011 | Wilby | |
| 2011/0061995 A1 | | 3/2011 | Huff et al. | |
| 2011/0112758 A1 | | 5/2011 | D'Andrea et al. | |
| 2011/0208745 A1 | | 8/2011 | Dietsch et al. | |
| 2013/0004289 A1 | * | 1/2013 | Gaudette | B65G 47/904 414/807 |

* cited by examiner

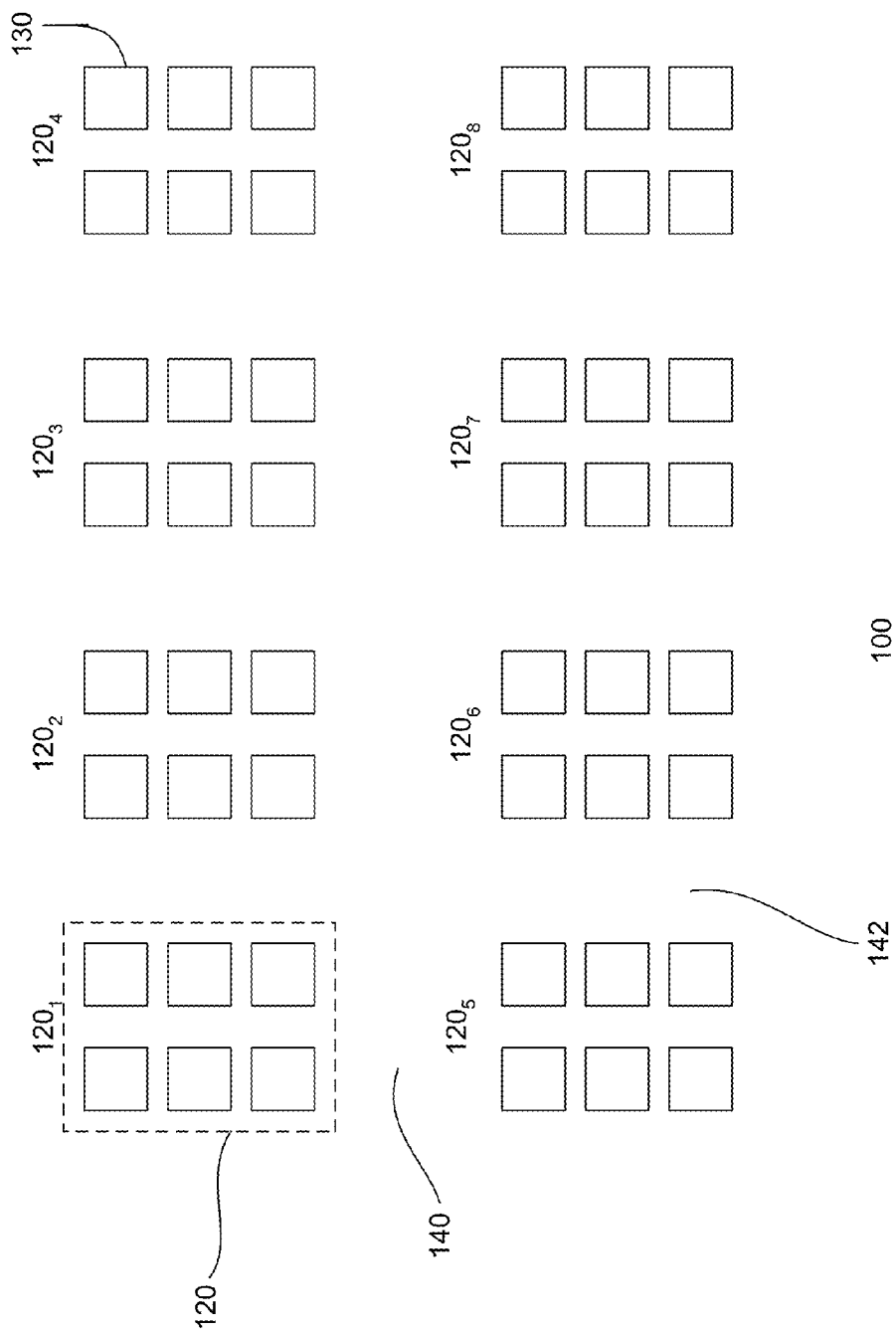

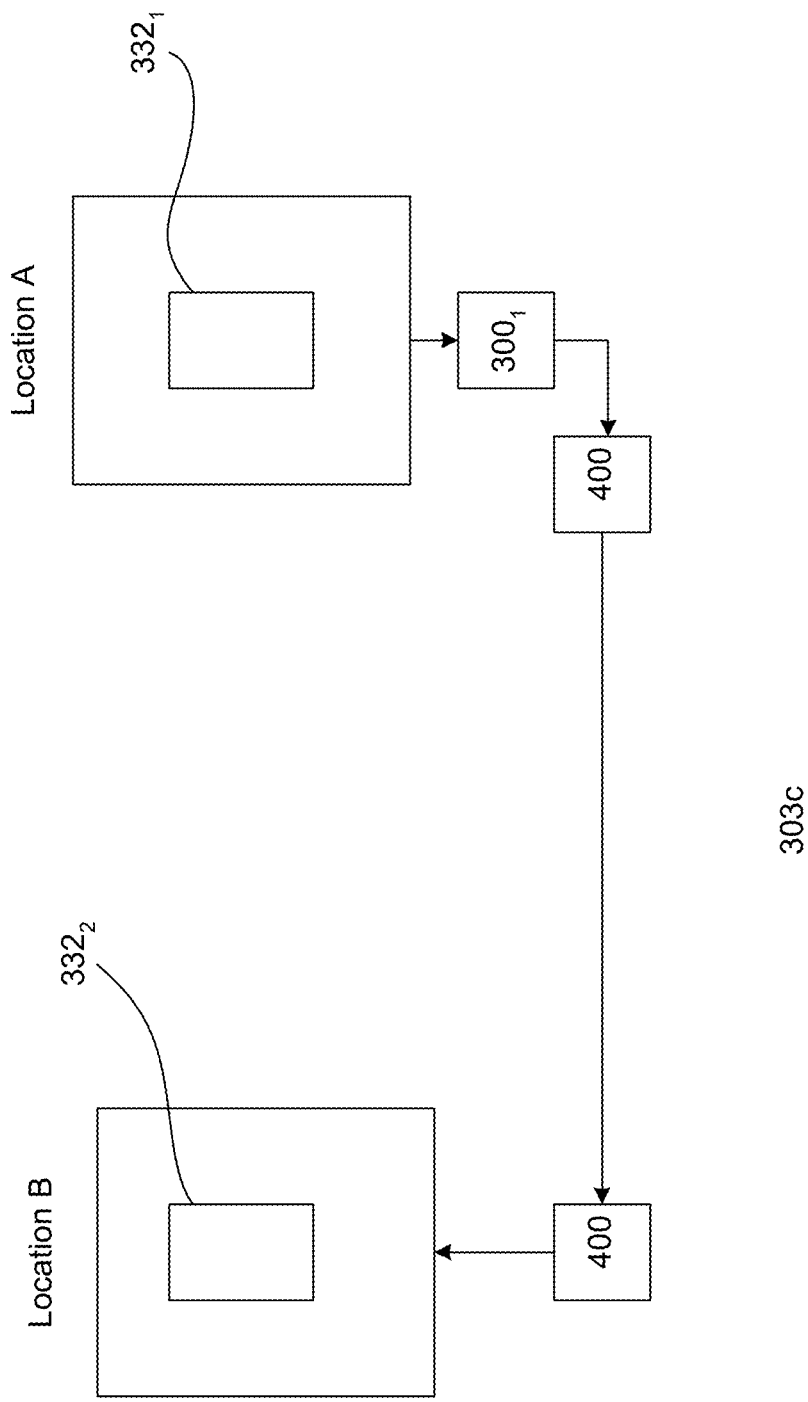

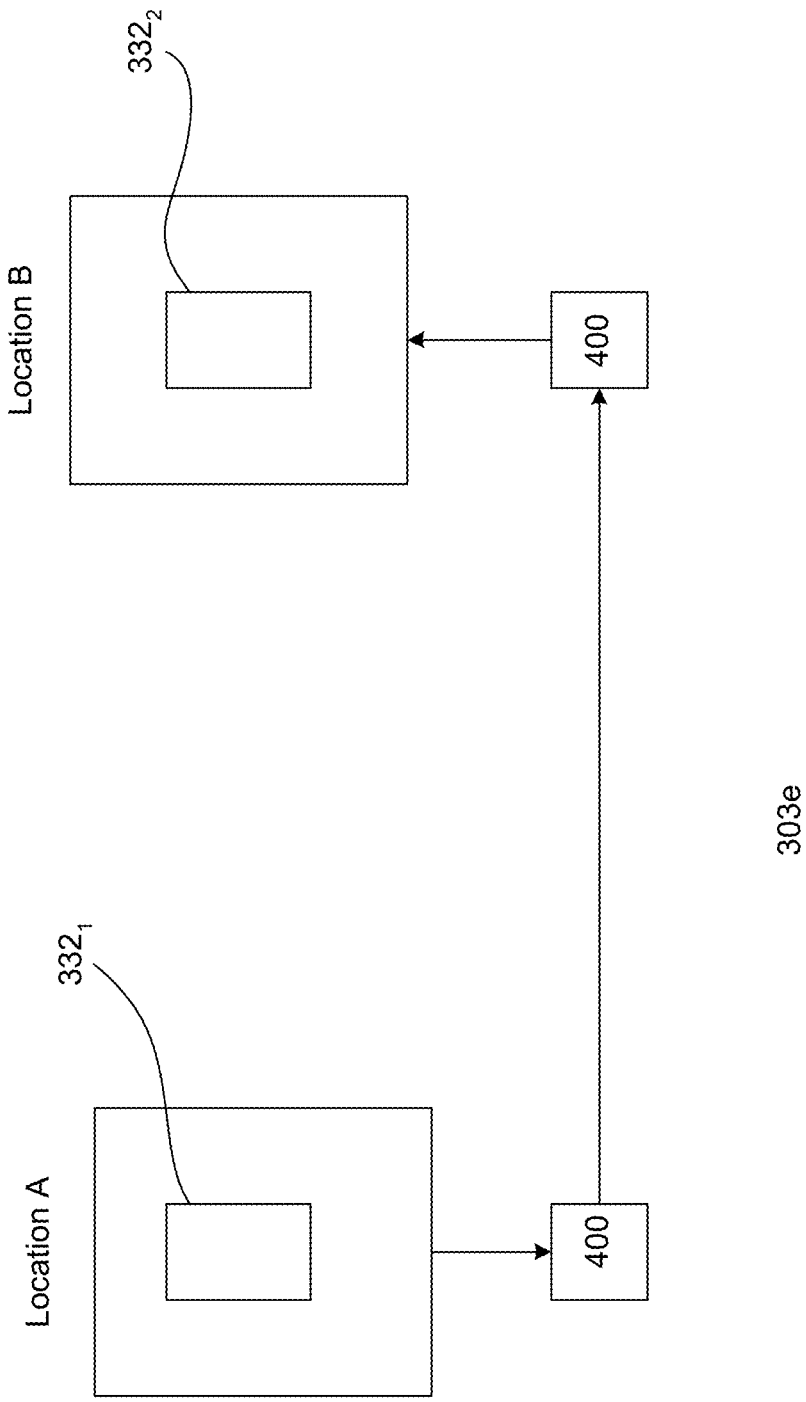

| Column | Source | Type | Size | Null? | Description |
|---|---|---|---|---|---|
| POD_LOC | EM | Varchar2 | 20 | PK | |
| STATE | EM | Varchar2 | 10 | Yes | ARRIVED, REMOVED |
| REQUEST | EM/AMA | Varchar2 | 10 | Yes | REQ_LOAD, REQ_UNLOAD, ASSIGNED, DONE |
| EQPT_ID | EM | Varchar2 | 8 | No | |
| ARM_ID | EM | Varchar2 | 10 | Yes | |
| POD_TYPE | EM | Varchar2 | 4 | No | PR, MT, NULL(not POD) |
| AREA | EM | Varchar2 | 10 | No | |
| RECIPE | EM | Varchar2 | 8 | Yes | |
| LOT_ID | EM | Varchar2 | 12 | Yes | |
| REQUEST_TIME | EM | Date | | Yes | |
| STATUS_TIME | AMA | Date | | Yes | |

Fig. 7a

| Column | Source | Type | Size | Null? | Description |
|---|---|---|---|---|---|
| POD_LOC | EM | Varchar2 | 20 | Yes | ARRIVED, REMOVED |
| STATE | EM | Varchar2 | 10 | Yes | |
| REQUEST | EM / AMA | Varchar2 | 10 | Yes | REQ_LOAD, REQ_UNLOAD, ASSIGNED, DONE |
| EQPT_ID | EM | Varchar2 | 8 | No | |
| ARM_ID | EM | Varchar2 | 10 | Yes | |
| POD_TYPE | EM | Varchar2 | 4 | No | PR, MT, NULL(not POD) |
| AREA | EM | Varchar2 | 10 | No | |
| RECIPE | EM | Varchar2 | 8 | Yes | |
| LOT_ID | EM | Varchar2 | 12 | Yes | |
| REQUEST_TIME | EM | Date | | Yes | |
| STATUS_TIME | AMA | Date | | Yes | |
| Command | AMA | Varchar2 | 10 | Yes | INSERT, UPDATE, DELETE |

Fig. 7b

| Column | Source | Type | Size | NullP | Description |
|---|---|---|---|---|---|
| POD_LOC | EM | Varchar2 | 20 | PK | |
| STATE | EM | Varchar2 | 10 | Yes | ARRIVED, REMOVED |
| REQUEST | EM/AMA | Varchar2 | 10 | Yes | REQ_LOAD, REQ_UNLOAD, ASSIGNED, DONE |
| EQPT_ID | EM | Varchar2 | 8 | No | |
| ARM_ID | EM | Varchar2 | 10 | Yes | |
| POD_TYPE | EM | Varchar2 | 4 | No | PR, MT, NULL(not POD) |
| AREA | EM | Varchar2 | 10 | No | |
| RECIPE | EM | Varchar2 | 8 | Yes | |
| LOT_ID | EM | Varchar2 | 12 | Yes | |
| REQUEST_TIME | EM | Date | | Yes | |
| STATUS_TIME | AMA | Date | | Yes | |
| JOB_ID | AMA | Varchar2 | 10 | Yes | |

Fig. 7c

| Column | Source | Type | Size | Null? | Description |
|---|---|---|---|---|---|
| POD_LOC | EM | Varchar2 | 20 | PK | |
| STATE | EM | Varchar2 | 10 | Yes | ARRIVED, REMOVED |
| REQUEST | EM/AMA | Varchar2 | 10 | Yes | REQ_LOAD, REQ_UNLOAD, ASSIGNED, DONE |
| EQPT_ID | EM | Varchar2 | 8 | No | |
| ARM_ID | EM | Varchar2 | 10 | Yes | |
| POD_TYPE | EM | Varchar2 | 4 | No | PR, MT, NULL(not POD) |
| AREA | EM | Varchar2 | 10 | No | |
| RECIPE | EM | Varchar2 | 8 | Yes | |
| LOT_ID | EM | Varchar2 | 12 | Yes | |
| REQUEST_TIME | EM | Date | | Yes | |
| STATUS_TIME | AMA | Date | | Yes | |
| JOB_ID | AMA | Varchar2 | 10 | Yes | |
| Command | AMA | Varchar2 | 10 | Yes | INSERT, UPDATE, DELETE |

Fig. 7d

| Column | Source | Type | Size | Null? | Description |
|---|---|---|---|---|---|
| JOB_ID | AMA | Varchar2 | 10 | PK | |
| JOB_STATUS | AMA | Varchar2 | 10 | No | |
| FROM_LOC | AMA | Varchar2 | 20 | | Pod location Id |
| FROM_EQPT | AMA | Varchar2 | 8 | | |
| TO_LOC | AMA | Varchar2 | 20 | | |
| TO_EQPT | AMA | Varchar2 | 8 | | |
| STATUS | AMA | Varchar2 | 10 | | REQUEST, EXECUTE, FROM_DONE, FAIL, COMPLETE |
| LOT_ID | AMA | Varchar2 | 12 | | |
| POD_TYPE | AMA | Varchar2 | 4 | | PR, MT, CS |
| AREA | AMA | Varchar2 | 10 | | Area |
| ZONE | AMA | Varchar2 | 10 | | |
| HANDLER_ID | AGV | Varchar2 | 10 | | |
| JOB_TIME | | Date | | | Request time |
| STATUS_TIME | | Date | | | |

Fig. 7e

| Column | Source | Type | Size | Null? | Description |
|---|---|---|---|---|---|
| LOT_ID | EM | Varchar2 | 12 | PK | |
| POD_LOC | EM | Varchar2 | 3 | No | |
| RESERVED_TIME | AMA | Date | | | |

Fig. 7f

| Column | Source | Type | Size | Null? | Description |
|---|---|---|---|---|---|
| LOT_ID | AMA/EM | Varchar2 | 12 | PK | |
| LOT_TYPE | AMA/EM | Varchar2 | 3 | No | |
| LOCATION | AMA/EM | Varchar2 | 10 | No | Lot location(EM / W/prackpod handler) |
| STATUS | AMA/EM | Varchar2 | 10 | | WAIT, RESERVED, ASSIGNED, PICKUP, DROPOFF, RUN, TRANSIT |
| AREA | AMA/EM | Varchar2 | 10 | | Area |
| RECIPE | AMA/EM | Varchar2 | 8 | | Promis recipe |
| TIMESTAMP | AMA/EM | Date | | | |
| RESERVED_BY | AMA/EM | Varchar2 | 12 | | |
| RESERVED_TIME | AMA/EM | Date | | | |

Fig. 7g

| Column | Source | Type | Size | Null? | Description |
|---|---|---|---|---|---|
| LOT_ID | EM | Varchar2 | 12 | PK | |
| EQPT_ID | EM | Varchar2 | 8 | PK | |
| RECIPE | EM | Varchar2 | 8 | PK | Promis recipe |
| ERR_CODE | EM | Varchar2 | 10 | | |
| ERR_MSG | EM | Varchar2 | 50 | | |
| TIMESTAMP | EM | Date | | | |

Fig. 7h

| Column | Source | Type | Size | Null? | Description |
|---|---|---|---|---|---|
| EQPT_ID | EM | Varchar2 | 8 | | |
| POD_LOC | EM | Varchar2 | 20 | | Pod locationId |
| IN_OUT | EM | Varchar2 | 4 | | IN, OUT, BOTH |
| AREA | EM | Varchar2 | 10 | | |
| ZONE | EM | Varchar2 | 10 | | |

Fig. 7i

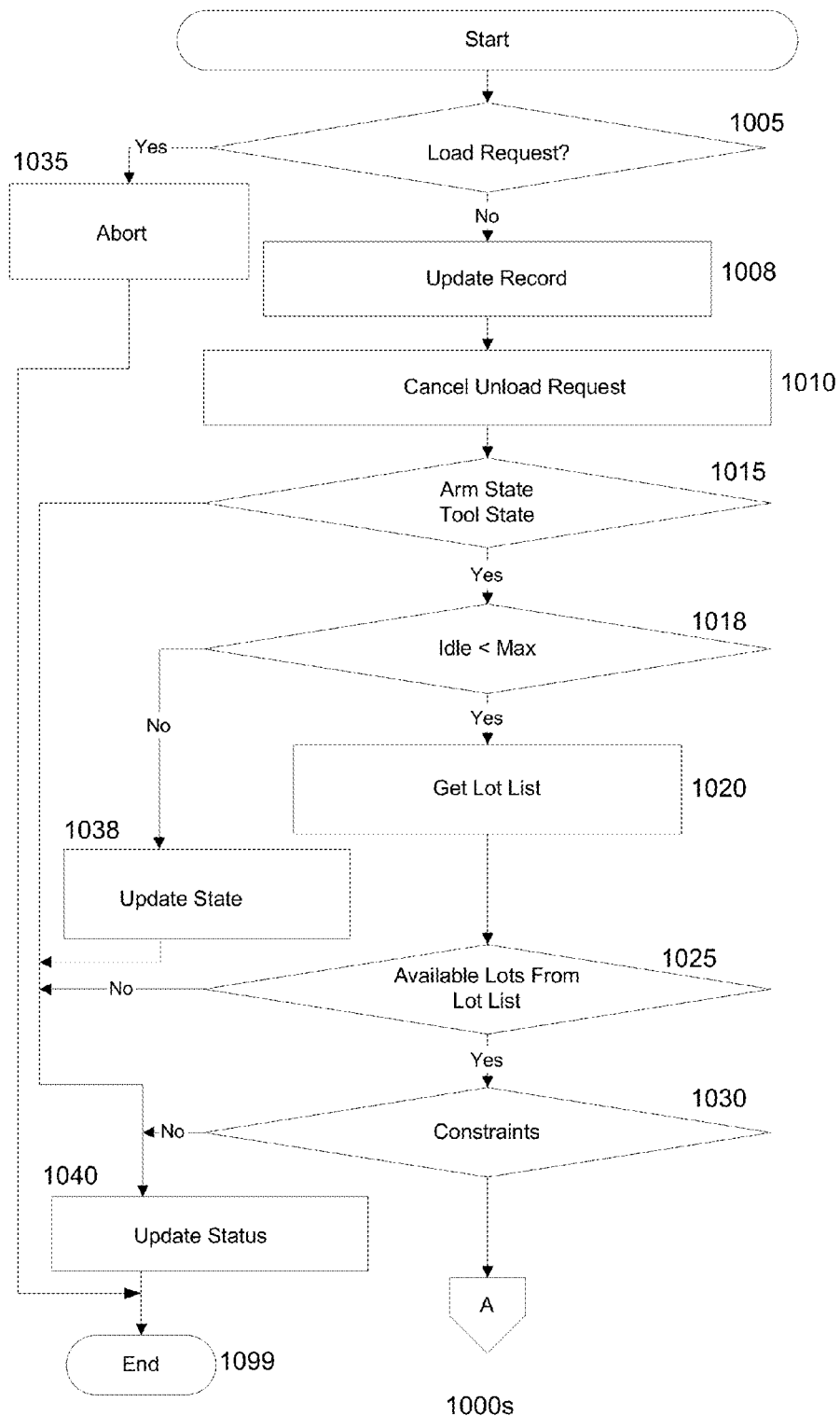
Fig. 10a1

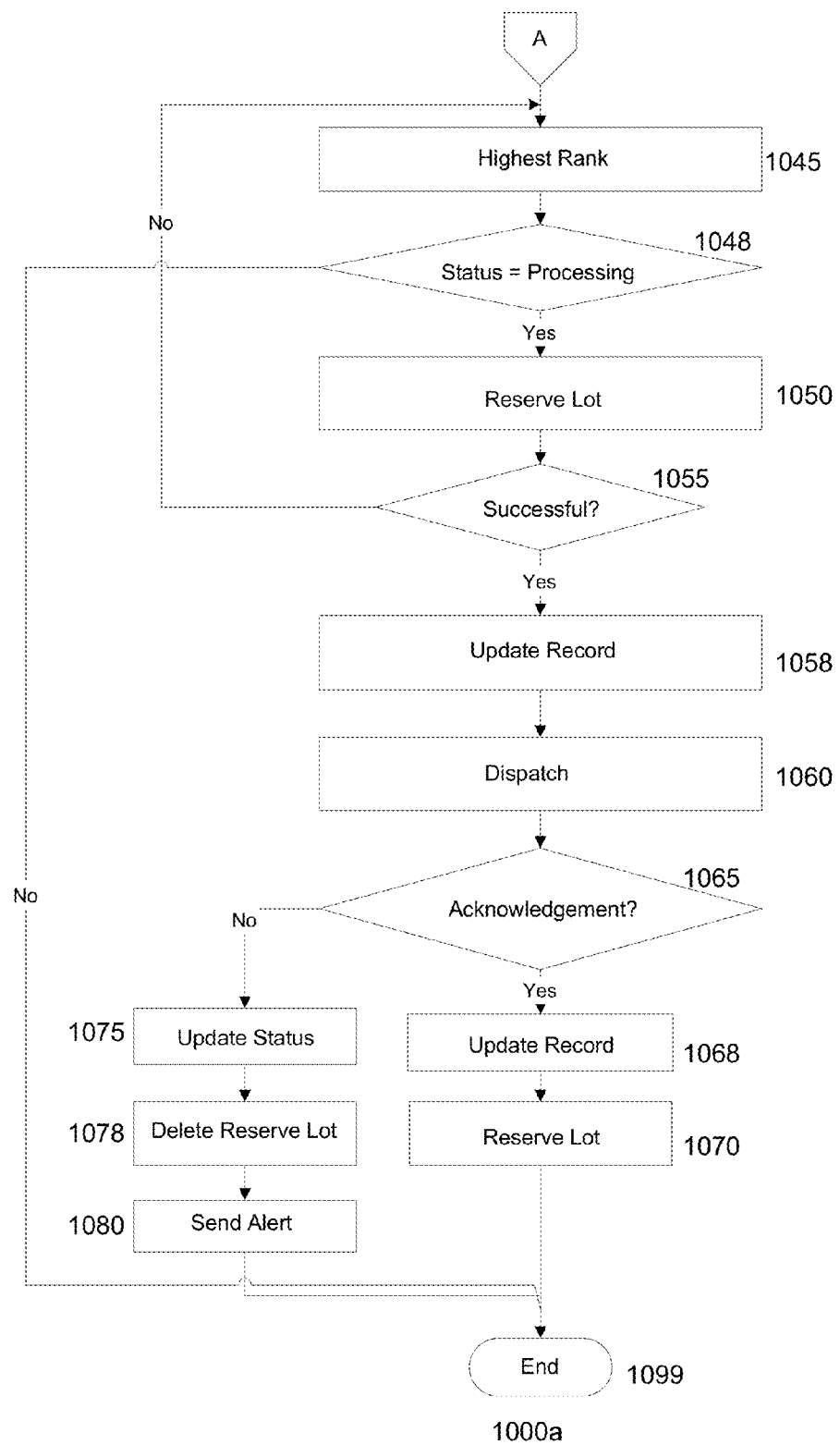
Fig. 10a2

1000b

EFFICIENT TRANSFER OF MATERIALS USING AUTOMATED GUIDED VEHICLES IN SEMICONDUCTOR MANUFACTURING

CROSS-REFERENCE

This application cross references to co-pending application U.S. Ser. No. 13/349,601 entitled "Efficient Transfer of Materials in Manufacturing", filed on Jan. 13, 2012, which is herein incorporated by reference for all purposes.

BACKGROUND

Manufacturing automation continues to become increasingly important as the need to improve factory efficiency and maintain high throughput production lines increases. In the manufacturing of semiconductor products, many processes and tools are needed in order to produce completed products for the market. For example, manufacturing of semiconductor products may include over 400 processing steps involving more than 100 different tools. Furthermore, the process route can include a high level of reentrance in which the same tool or tool types are used. An important aspect in manufacturing automation is material handling. To facilitate material handling, a transport system is often employed to support the production line.

Conventional transport systems used in, for example, semiconductor manufacturing include transport vehicles, such as overhead transport (OHT) for transferring wafers contained in a carrier. The use of such systems, however, requires human interaction. For example, human operators are required to load and unload carriers onto and from the transport vehicles. The presence of human operators increases risk of contamination, risk of human error and labor cost. These factors undesirably drive up manufacturing costs.

It is desirable to improve material handling to lower manufacturing costs and increase manufacturing efficiency.

SUMMARY

Embodiments generally relate to methods for automated handling for forming a device and a computer executed automated handling system for forming a device. In one embodiment, a method for manufacturing automation is provided. The method includes issuing a transfer request by a tool. The transfer request is processed by a production control system configured for tracking and controlling the flow of carriers. The processing of the transfer request includes selecting a carrier containing production material, controlling a transport system having transport and load/unload (U/L) units in a production area to effect a transfer, and transferring the carrier by the transport system.

In another embodiment, a computer executed automated handling system for forming a device is disclosed. The system includes a production control system configured for tracking and controlling the flow of carriers in a production area. The production control system includes a manufacturing execution system (MES) configured to track carrier information and status of the tool. The production control system includes an activity manager automation (AMA) module which includes an AMA database having tables to track information related to production facility and is configured to select a carrier and issue a dispatch request to effect a transfer of the selected carrier. The production control system further includes an area server module configured to receive a transfer request from the tool and updates the AMA database and an automated guided vehicles (AGV) manager module configured to instruct and control a transport system to effect the transfer of the selected carrier.

In yet another embodiment, a method of manufacturing devices is presented. The method includes processing a carrier containing production material in a tool. A conversion in status of the carrier to a ready to unload state is detected. A transfer request is issued by the tool. The transfer request is processed by a production control system configured for tracking and controlling the flow of carriers. The processing of the transfer request includes controlling a transport system having transport and load/unload (U/L) units in a production area to effect a transfer, and dispatching a selected transport system to pick up the carrier from the tool.

In still another embodiment, a non-transitory computer readable medium having stored thereon program code is presented. The program code is executable by a computer for manufacturing automation to receive a transfer request by a tool in a production area. The program code is also executable by the computer to process the transfer request. The processing of the transfer request includes selecting a carrier containing production material, controlling a transport system comprising transport and load/unload (U/L) units in a production area to effect a transfer, and transferring the carrier by the transport system.

These and other advantages and features of the embodiments herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference numbers generally refer to the same parts throughout the different views. Also, the drawings are not necessarily to scale, emphasis instead generally being placed upon illustrating the principles of the invention. In the following description, embodiments of the invention will now be described, by way of example with reference to the drawings of which FIGS. 1a-d show various embodiments of a layout of a fabrication facility and possible routing of material transfers;

FIGS. 3a-e show various types of material transfers;

FIGS. 7a-i show exemplary embodiments of various tables in an AMA database;

FIGS. 10a-g show various logic performed by an AMA module.

DESCRIPTION

Figure 1B:
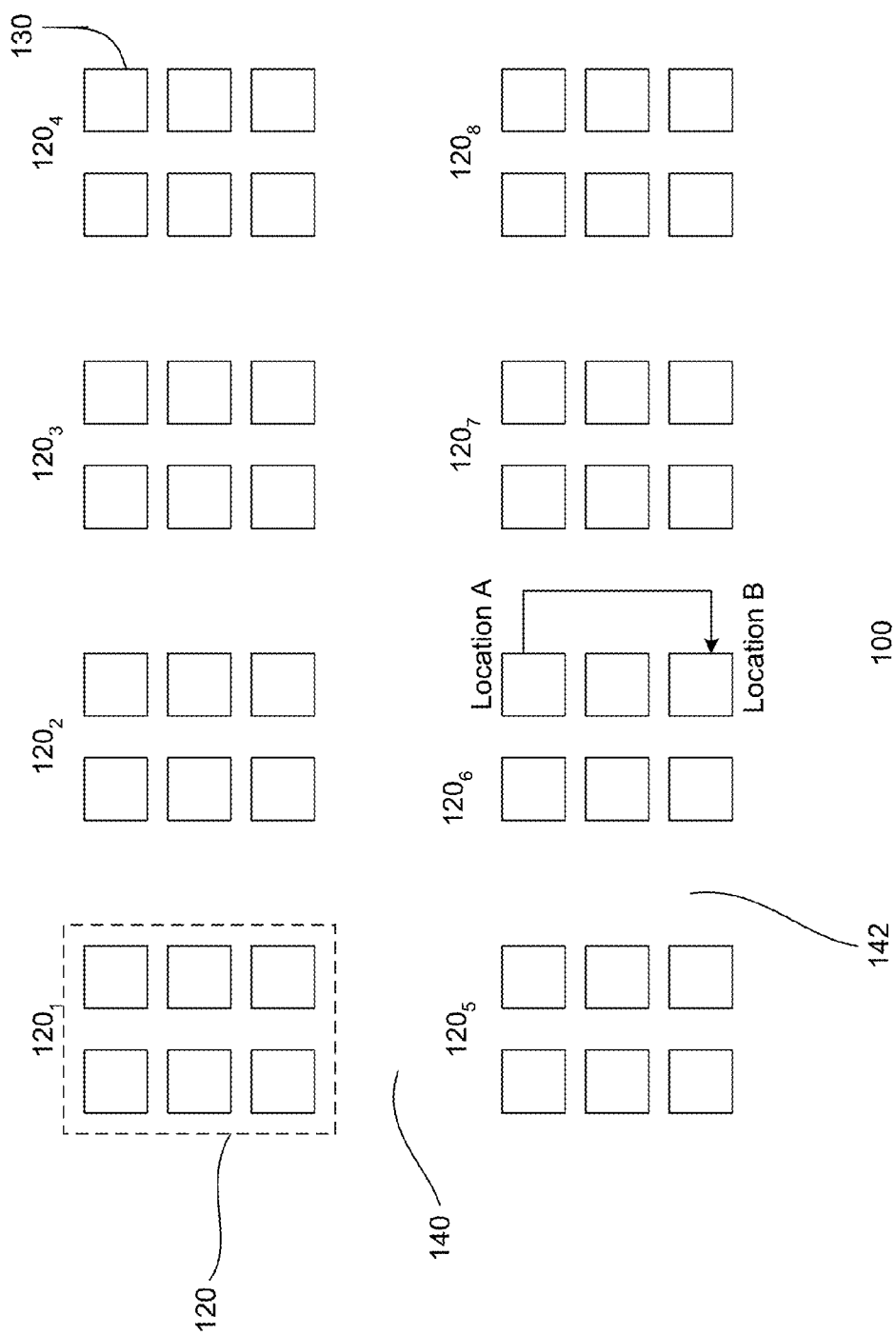

FIG. 1a shows a layout of an exemplary embodiment of a production area 100 of a manufacturing facility. The manufacturing facility may include other areas to facilitate the manufacturing of articles. Such areas, for example, may include research & development (R&D), administration and management, storage, and shipping areas. Additional or other areas may also be provided.

In one embodiment, the production area is a clean room for manufacturing semiconductor devices. The production area may also be used to manufacture other types of devices as found in a semiconductor foundry. The clean room may be a class 100 clean room. Providing clean rooms having other levels of cleanliness may also be useful. The class of clean room, for example, may depend on the technology.

The production area, for example, may be used to produce different types of devices for different customers and different industries. Producing other types of devices, such as flat panel displays (FPDs), which includes liquid crystal displays (LCDs), is contemplated herein.

In semiconductor manufacturing, a carrier is used to contain a batch (lot) of wafers for moving from one location to another in the manufacturing facility. The carrier, for example, may be referred to as a pod. Various types of carriers may be employed. For example, the carrier may be a front opening unified pod (FOUP). Other types of carriers, such as a standard mechanical interface (SMIF) pod, may also be employed. A carrier, for example, has the capacity of 25 wafers. Providing carriers capable of containing other number of wafers may also be useful. For example, a carrier may have a capacity of 13 wafers. A wafer lot may contain any number of wafers up to the capacity of the pod. For example, a wafer batch may contain 1-25 or 1-13 wafers. It is understood that the production facility may utilize different types of carriers, including FOUPs and SMIFs as well as different capacities, such as 13 and 25.

In one embodiment, each wafer is associated with a wafer identification (ID) and each carrier is associated with a carrier or lot ID. A carrier is provided with a carrier tag which contains the carrier ID as well as wafer IDs of wafers contained therein. The carrier tag, for example, also includes information related to the wafers. Such information may include process recipes, customer, priority, delivery date, and other information which enables the wafer to be traced back to the supplier. Providing wafer IDs and carrier IDs enables tracking of each wafer in the manufacturing process. The tag, for example, may be a smart tag having a memory for storing information. Information may be written to or read from by, for example, an infrared reader/writer. Other types of tags, such as radio frequency identification (RFID) tags may also be useful.

Tools 130 are disposed in the production area for use in the production of devices. In one embodiment, the tools are used to process wafers to form semiconductor devices. The tools, for example, may include lithographic tools, deposition tools, such as chemical vapor deposition (CVD) tools, ion implanters, and patterning tools, such as reactive ion etch (RIE) tools. The production area may also include other types of tools, such as those used in failure analysis, testing as well as other functions or purposes. For other industries and in the production of other devices, other types of tools may be provided or included in the facility as are customarily associated with such industries or other devices.

Tools of the production facility, in one embodiment, include machine supervisory programs (MSP) for controlling the operation of the tools. The MSP is a computer program which is provided with and controls the operation of each tool. In one embodiment, tool indexers are provided for the tools. In one embodiment, each tool is associated with an indexer. An indexer is configured to read the carrier tag. In one embodiment, the indexer retrieves information contained in the carrier tag and passes it to the MSP of the tool to which it is associated. The indexer, for example, serves as an interface between the MSP and carrier tag.

An interface may be provided to enable an operator to communicate with the MSP. The interface, for example, may be a computer integrated manufacturing (CIM) interface. Other types of interfaces may also be useful.

In one embodiment, the tools are arranged in groups or bays 120. The tools within a bay may be arranged in a loop configuration. A bay may include different types of tools. In some cases, a bay may include sub-groups of tools. In yet other cases, a bay may include different individual tools as well as one or more sub-group of tools. Other configurations of tools for a bay may also be useful. Although the bays are shown with the same number of tools, it is understood that different bays may have different number and configurations of tools.

For purposes of illustration, the bays are arranged in columns and rows. For example, eight bays $120_{1-8}$ are arranged in two symmetrical rows of four columns each. Main isles 140 and 142 may be provided in the row and column directions. For example, the row main isle 140 separates the rows of bays while the column main isle 142 separates bays in the column direction. As shown, the column main isle is disposed between the second and third column of bays. The main isles, for example, are used for movement of materials between bays (inter-bay). Secondary isles 144 between bays as well as within bays may be used for movement of materials within a bay (intra-bay). Other arrangements may also be employed for inter-bay and intra-bay movement of materials.

Although illustrative, the production area includes two rows and four columns of symmetrically disposed bays, it is understood that a production area may have numerous rows and columns of bays which may not be necessarily symmetrically disposed in the production area. For example, the bays may have different sizes and footprints in the production area and may not be equally spaced apart. Furthermore, other numbers of main column and row isles may also be useful, depending on the overall layout and number of bays.

The production area may include sub-areas which are on different planes, forming stepped production sub-areas. For example, the production area may include two sub-areas, one disposed or is stepped up relative to the other. It is understood that the production area may have more than two sub-areas. Ramps may be provided between the stepped production areas to facilitate transfer of materials from one sub-area to the other.

In some embodiments, the production area may be separated into a plurality of production areas. For example, the manufacturing facility may include more than one production areas. The production areas are housed in separate buildings or structures (fabs). Illustratively, as shown in FIG. 1d, the manufacturing facility includes a first fab 110 with bays $120_{1-4}$ and a second fab 111 with bays $121_{1-4}$. Each fab, for example, is a separate clean room. Fabs are interconnected by connectors 150. The connectors, for example, are outside of the clean room environments of the fabs. Providing connectors which is in a clean room environment may also be useful.

In one embodiment, stockers may be provided in the production area. The stockers may be disposed throughout the production area to provide temporary storage for carriers. In some embodiments, the stockers may be provisioned by overhead transport (OHT) units of an OHT system. In other embodiments, the stockers can include a combination of stockers and OHT units. In yet other embodiments, the stockers may be provisioned by unload/load (U/L) units.

Figure 2A:
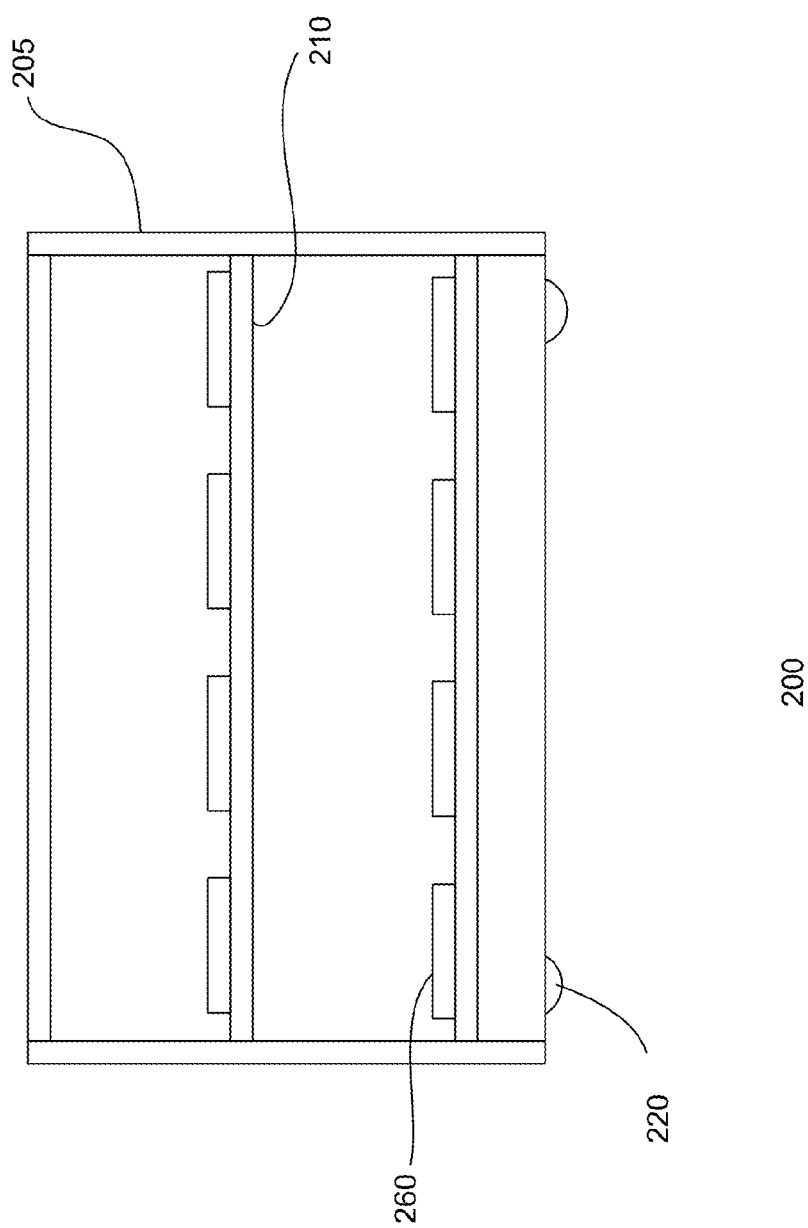
FIGS. 2a-c show embodiments of a work-in-progress (WIP) rack, an unload/load (U/L) unit and a transport unit.

Additionally, the production area may include work-in-progress (WIP) racks. FIG. 2a shows an embodiment of a WIP rack 200. As shown, the rack includes shelves 210 mounted on a rack frame 205. The rack, for example, includes two shelves. Providing racks with other number of shelves may also be useful. In one embodiment, the rack includes wheels 220 to facilitate moving the rack. In some embodiments, the rack may include a drive system for a mechanized movable rack.

In one embodiment, the shelves are configured with smart trays 260. The smart trays are used to hold carriers. A rack may be used as an alternative to a stocker or other purposes, such as facilitating transfer of carriers from one level of the production area to another. Each smart tray in the rack includes a tray ID. In one embodiment, the smart tray includes a tray tag for containing the tray ID. The tray tag also includes additional information of the carrier which it is holding. The tray tag, for example, is capable of reading or retrieving information contained in the carrier tag of the carrier it is containing. The tray tag, for example, may be accessed by infrared reader/writer. Other types of tray tags, such as radio frequency tags may also be useful.

A rack is associated with a rack ID. The rack ID, for example, is contained in a rack tag. The rack tag may also include other information. For example, the rack tag may include tray IDs on the rack, carrier IDs and associated information of the carriers on the trays. The rack tag, for example, may be accessed by infrared reader/writer. Other types of rack tags, such as radio frequency tags may also be useful.

The tools, stockers and WIP racks may be collectively referred to as equipment or machines. Additionally, other types of equipment which include an ID tag may be collectively referred to as machines.

A transport system is provided for moving carriers in the production process. The transport system facilitates intra-bay, inter-bay and inter-fab transfers of carriers in the production process.

FIG. 1b shows the transport system performing an intra-bay transfer of a carrier within the same bay. As shown, the transport system transfers a carrier from Location A to Location B, both within bay $120_6$. Location A may be a tool and Location B may be another tool, resulting in a direct tool-to-tool transfer. For example, the transport system transports a processed carrier from the unload port of the tool at Location A to the load port of the tool at Location B. Depending on the tool, it may have separate load and unload ports or a common port for both loading and unloading. Other configurations of ports for tools may also be useful. Alternatively, Location A may be a tool while Location B may be another tool from a different group of tools. An indirect tool-to-tool transfer may also be effected. An indirect transfer involves more than one transfer between tools. For example, one location may be a tool (Location A or Location B) while the other location (Location B or Location A) may be a stocker or a rack. An indirect transfer may also involve stockers, racks or a combination thereof at both locations. In some cases, an indirect transfer involves more than two transfers between tools. Other types of transfer may also be useful.

Figure 1C:
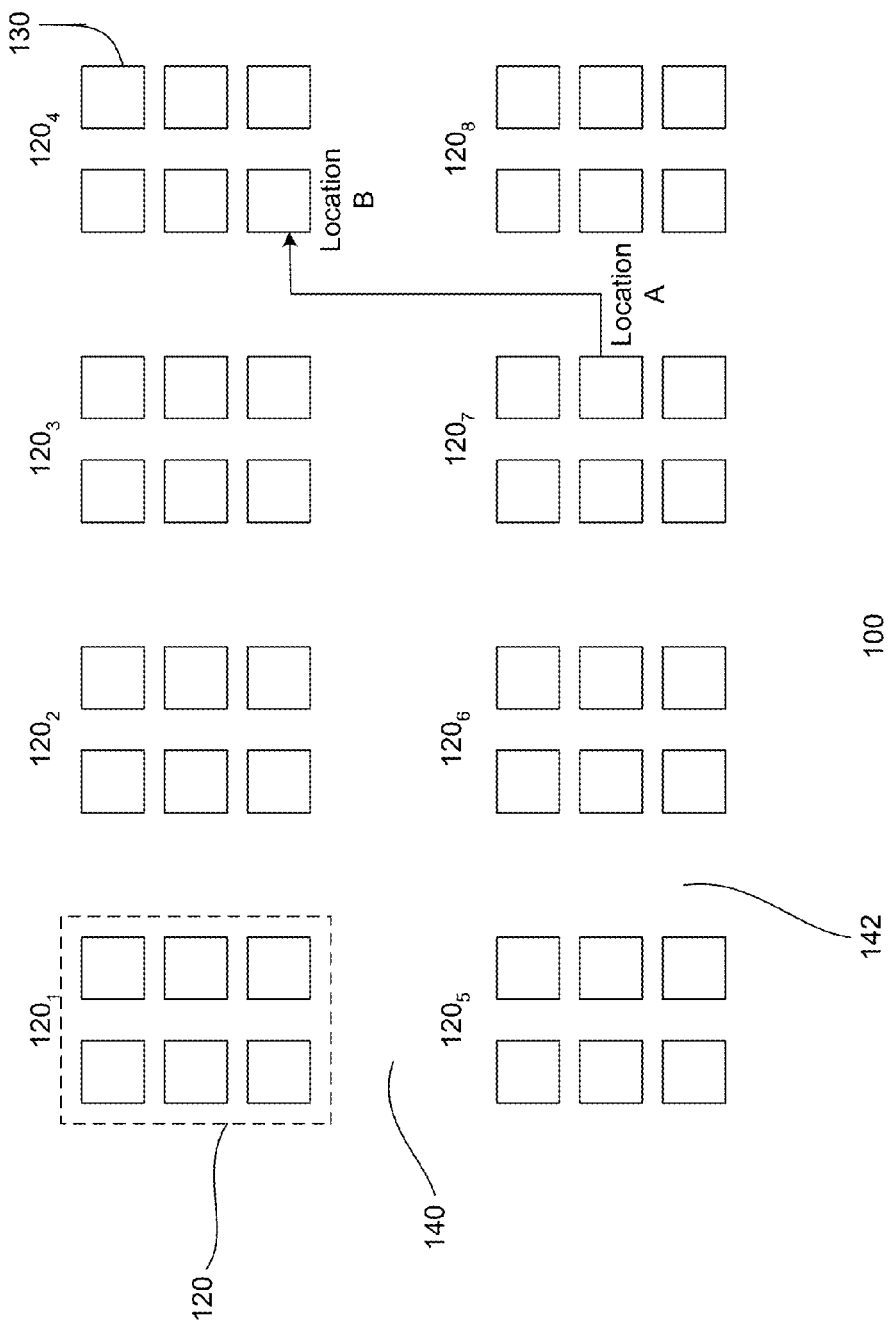
Figure 1D:
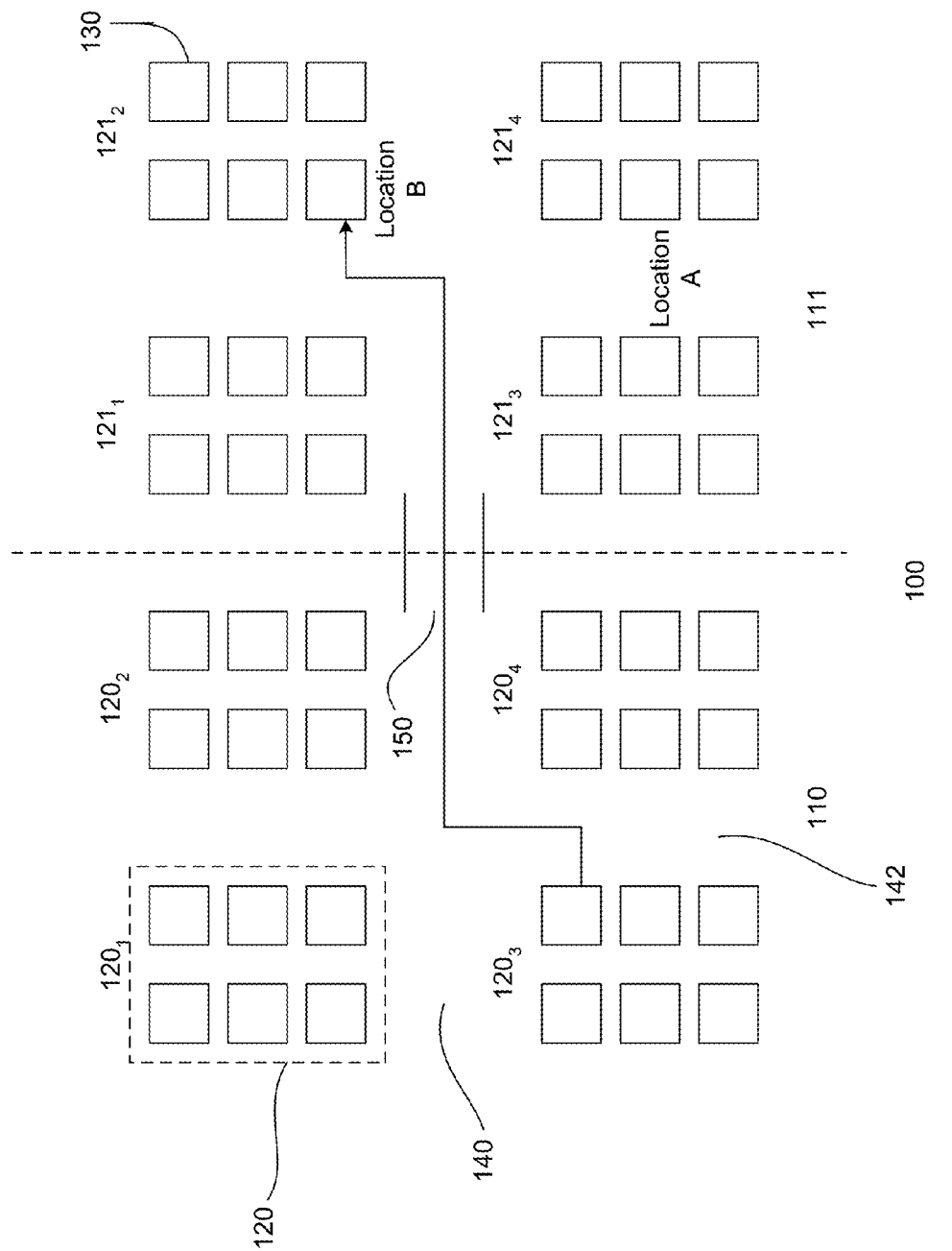

FIG. 1c shows the transport system performing an inter-bay transfer of a carrier between different bays. As shown, the transport system transfers a carrier from Location A in bay $120_7$ to Location B in bay $120_4$. The transfer, for example, is an indirect tool-to-tool transfer. For example, Location A may be a tool while Location B may be a stocker or a WIP rack. Alternatively, Location A may be a stocker or a WIP rack while Location B may be a tool. In some cases, both Location A and Location B may be a stocker, a rack or a combination thereof. In other embodiments, the transfer may be a direct tool-to-tool transfer.

FIG. 1d shows the transport system performing an inter-fab transfer of a carrier between different fabs. As shown, the transport system transfers a carrier from Location A in bay $120_3$ of fab 110 to Location B in bay $121_2$ of fab 111. The inter-fab transfer may be an indirect tool-to-tool transfer. Providing an inter-fab direct tool-to-tool transfer may also be useful. For example, Location A and Location B include tools.

Figure 2B:
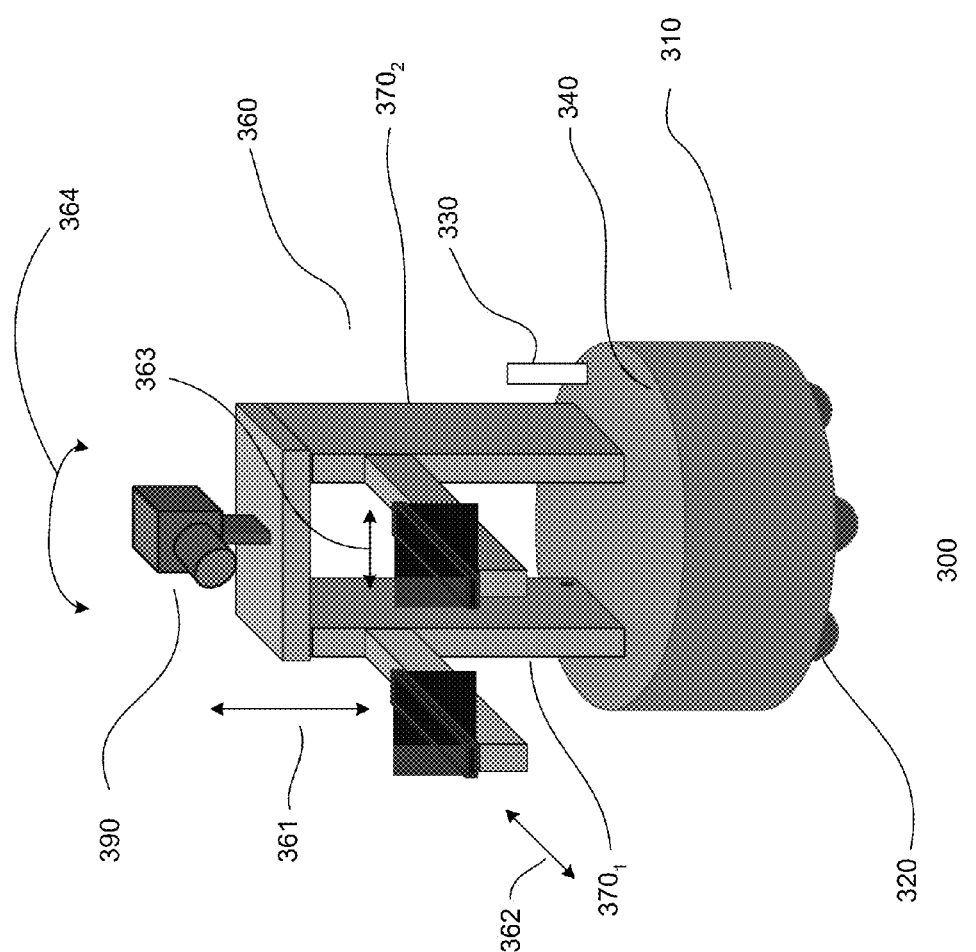
Figure 2C:
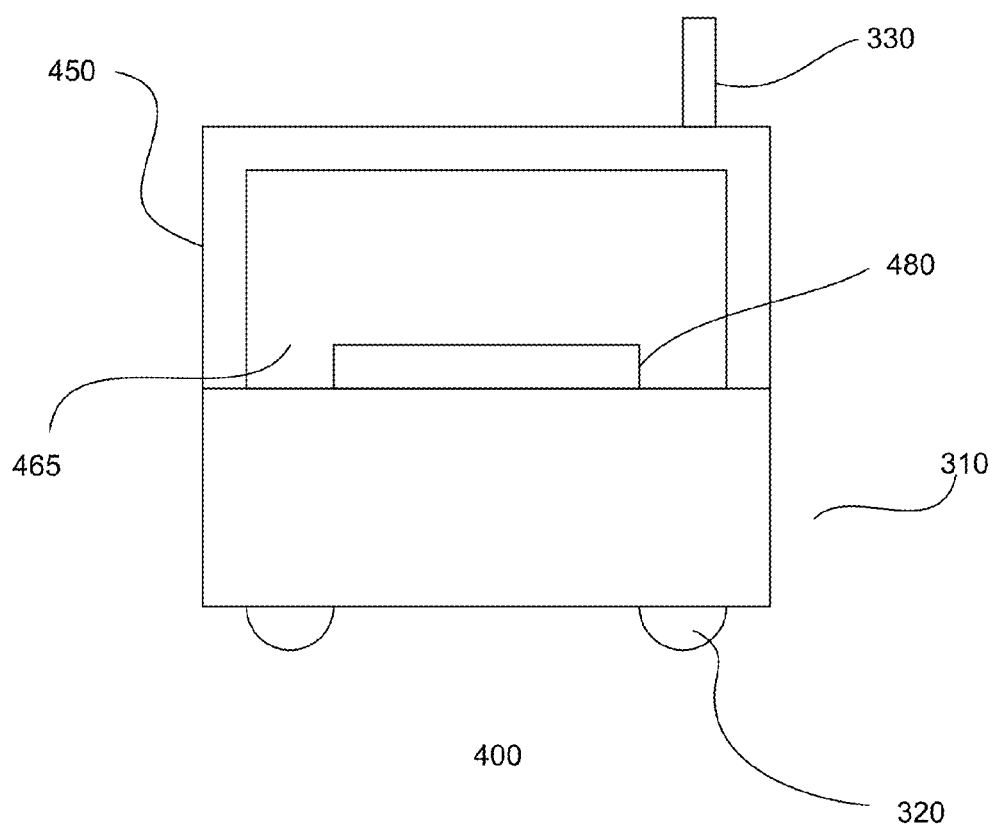

In one embodiment, the transport system includes transport and U/L units. FIG. 2b shows a simplified view of an embodiment of a U/L unit 300 and FIG. 2c shows a simplified view of an embodiment of a transport unit 400. The transport and U/L units are employed to automatically transfer a carrier from a first location (Location A) to a second location (Location B). In one embodiment, the transport and U/L units are autonomously operated automated guided vehicles (AGVs) which can freely move within the manufacturing facility. Other types of transport and U/L units may also be useful.

Referring to FIGS. 2b-c, the units include a base 310. Wheels 320 are mounted to a bottom of the base. The base includes a drive module connected to the wheels for propelling the AGV. The drive module, for example, includes a motor and drive links coupling the motor to the wheels. In one embodiment, the motor is an electric motor powered by a power module, which may include a battery (not shown). The drive module is capable of moving the AGV in any direction, including going straight, making turns as well as rotating the base. In one embodiment, the drive module is capable of rotating the base 360°. The drive module should be capable of handling a carrying payload based on operational requirements. For example, in the case of carriers, the drive module of the base should be capable of carrying the desired amount of carriers. In other embodiments where the AGVs are used to handle devices such as flat panels, the drive module should be capable of handling the desired amount of flat panels.

The power module may also be used to power other components of the AGV. In one embodiment, the power module may include a replaceable battery. Preferably, the battery can be easily designed for quick and easy replacement. In one embodiment, the power module may be configured for quick and easy replacement. For example, the power module can easily be inserted or extracted from the base, which may contain additional batteries for facilitating automated replacement of a spent battery. The base can also include a charging coupler which facilitates automated charging of the power module. For example, the base can be moved into position at the charging bay for charging via the charging coupler.

The AGVs include a communication module. In one embodiment, the communication module is a wireless communication module, enabling it to communicate with tools, the manufacturing system as well as other AGVs. For example, the wireless communication module may include an antenna 330 to facilitate receiving and sending information by a transceiver. Other configurations of the communication modules may also be useful. The communication module may also include a tag reader. For example, the tag reader is capable of reading different types of ID tags in the manufacturing facility. For example, the tag reader is capable of reading the different tags of machines as well as the carriers. The reader, for example, may be an infrared reader. In some embodiment, the tag reader may be an RFID reader. Other types of tag readers may also be useful. The type of tag reader, for example, may depend on the type of tags to be read. The tag reader may also be capable of writing information to the tags. In some cases, more than one type of tag reader may be provided.

In one embodiment, the communication module includes communication sensors for communicating with doors, turnstiles, elevators or other possible barriers which may be in the path of travel of the units. The sensors, for example, allow for the AGV to open doors, pass through turnstiles, or to call for an elevator. Other types of communication sensors may also be provided to facilitate autonomous movement in the manufacturing facility. The communication sensors, for example, may be part of a sensor array which includes other types of sensors for other purposes.

The AGVs may include an interface unit for communicating with operators. For example, the interface may include a display and input subunits for displaying information and receiving commands, for example, from operators. The input subunit may be any type of input device, such as a keyboard, buttons or a combination thereof. Other types of interfaces or subunits may also be useful.

A navigation module, in one embodiment, is provided for the AGV. The navigation module may include an object detection module. The object detection module, for example, may include robotic vision module and sensors for detecting foreign objects. The robotic vision module may be a vision scanner or camera while the sensors may be proximity and temperature sensors. Other types of robotic vision module, sensors or techniques for detecting foreign objects may also be useful. The detection module may serve as a safety feature of the AGV. For example, the object detection module detects objects, such as people, walls, other AGVs or other objects which may be in the path of travel of the AGV. In one embodiment, the object detection module is capable of delineating between animate and inanimate as well as moving and non-moving objects.

In one embodiment, the AGV is programmed to avoid objects. Inanimate non-moving objects are avoided by moving around or away from them. For moving animate objects, such as another AGV, it communicates with the other AGV and determines a route for avoidance (slide pass). In the case where people are detected, the AGV may activate an alarm to indicate its presence. If people are moving, the AGV may be programmed to stop until movement has stopped or that the people have passed (stop and pass). On the other hand, for non-moving people, the AGV may slide pass. As such, objects detected are avoided by the AGV, enabling autonomous operation safely within a human environment.

The navigation module, in one embodiment, includes a map of the production facility. The map, for example, identifies machines and their locations in the production facility. The map also includes routes in the production facility. Additionally, the map may also include charging and service bays for the AGV. The map, for example, may be provided to the AGV. In one embodiment, the map may be a pre-defined map which is stored in a memory of the AGV. Using the map, the AGV can determine its position within the production area or manufacturing facility. Furthermore, the map facilitates tracking of AGV locations. For example, the AGV can communicate its location within the manufacturing facility to, for example, a production control system.

A variety of mapping technologies can be used and incorporated into the transport system. The mapping of the production facility and the equipment and their locations, for example, can be performed by the AGV using the tag reader and navigation system. Other techniques for mapping the production facility may also be useful. Additionally, the map may be updated as changes are made in the production facility. For example, new equipment, movement of equipment, new paths or routes may be updated to provide the AGV with a real time map.

The AGV may also include a diagnostic module. The diagnostic module performs diagnostics of the various components and systems of the AGV to ensure they are operational. The diagnostic module tracks servicing schedule for the AGV. When a problem is detected or servicing is due, the AGV proceeds to the service bay. Additionally, the diagnostic module monitors the charge level of the battery. When the charge level is below a threshold level, the AGV proceeds to the charging bay to have its battery recharged. The diagnostic module serves to reduce or pre-empt AGV failures.

With respect to a U/L unit, as shown in FIG. 2*b*, a robot system 360 is disposed on the base. The robot system may include one or more robot arms. For example, the robot system may include two robot arms. The robot arms are configured to handle carriers. For example, the robot arms may be configured to load and unload carriers from machines, including other AGVs such as U/L and transport units. In one embodiment, the robot arms are configured with multiple degrees of freedom to handle the carriers. Preferably, the robot arms are configured to have at least four degrees of freedom. The robot arms preferably are designed to mimic human arms. For example, the robot arms may be designed to have multiple joints, corresponding to shoulder, elbow and wrist joints. The robot arms may also include clamping or grapping units which may correspond to hands. Other types of robot systems may also be useful.

In some embodiments, the robot system may be configured to handle flat panels, for example, in the manufacturing of flat panel displays. The robot system, for example, is configured to carry flat panels in a vertical orientation (about normal to the production floor). For example, the robot system may include slots for holding the panels in place. A robot arm may load the panels into the slots to securely hold the panels. In other embodiment, a robot arm may be configured to include a slot which can close to engage a panel. For example, the robot arm may be configured to include an F-shaped portion which can engage a panel and be rotated. The arm may then be rotated to position the slot on the bottom of the panel for transport. Other configurations of robot systems for handling panels may also be useful.

In one embodiment, the robot system includes first and second robot arms $370_{1-2}$ configured to pickup and hold a carrier. The robot system may be disposed on a rotatable surface base 340. The rotatable surface base is disposed on the base and can rotate with respect to the base. The robot arms can be translated in first and second directions. The first and second directions, for example, are orthogonal to each other. In one embodiment, the robot arms can translate in a first direction (X-axis) normal to the plane of the production floor, as indicated by arrow 361, and in a second direction (Y-axis) parallel to the plane of the production floor, as indicated by arrow 362. The arms may also be configured to move in a direction (Z-axis) orthogonal to the X and Y axes and parallel to the plane of the production floor, as indicated by arrow 363. Additionally, the robot system can be rotated by the rotatable base. For example, the robot system can rotate around the X-axis (θ axis), as indicated by arrow 364. This provides the robot system with 4 degrees of freedom along the X-Y-Z-θ axes. The robot system should be configured to have a range of movement sufficient to load and unload carriers from machines, including tools, stockers, WIPs as well as transport and U/L units.

In other embodiments, the robot system may include a single robot arm. The single robot arm may be configured to handle a carrier and have multiple degrees of freedom. For example, the robot arm is configured to have at least 4 degrees of freedom, for example, along the X-Y-Z-θ axes.

The robot system includes a robotic vision unit 390. The robotic vision unit, for example, is a vision scanner or a camera. Other types of robotic vision units may also be useful. The robotic vision unit may be the robotic vision unit used for foreign object detection, as previously discussed. The robotic vision unit is configured to distinguish between indexers of tools and objects which are not indexers (foreign objects). This facilitates correct positioning of the carrier with respect to the indexer. In one embodiment, alignment markers may be employed to facilitate accurate positioning of the robot arms. In other embodiments, the robot unit and/or machines may include positioning sensors to facilitate accurate positioning of the robot arms. A robot control unit is used to control the movements of the robot arms. Using the input from the robotic vision unit, the robot control unit can precisely position the robot arms for loading and unloading of a carrier.

In another embodiment, the U/L unit may be configured to support the robot system and a storage area for holding one or more carriers. For example, a carrier holder may be provided on the base or rotatable surface base to support a carrier. The carrier holder, for example, is configured to securely hold at least one carrier in place for transport. The carrier holder may include a lock. The lock engages when a carrier is placed in the carrier holder. The lock, for example, prevents unauthorized removal of the carrier from the carrier holder. The lock disengages when the unit arrives at its destination. In some embodiment, an operator may disengage the lock by inputting the appropriate code.

In some embodiment, the U/L unit includes one or more carrier holders (not shown). A carrier holder is configured to hold a carrier. For multiple carriers, they can be configured on one plane, on different planes to form a stack configuration, or a combination thereof. The carrier holders may be mounted on a frame. Other configurations of carrier holders may also be useful. In another embodiment, a jig (not shown) may be provided to adapt the carrier holder to hold a white box which is used to contain wafers for shipping and storage. The white box is smaller in dimension than the carrier. The jig provides support for transporting a white box.

As for the transport unit 400, as shown in FIG. 2c, a carrier holder 480 is disposed on the base. The carrier holder, for example, is configured to securely hold at least one carrier in place for transport. The carrier holder may include a lock. The lock engages when a carrier is placed in the carrier holder. The lock, for example, prevents unauthorized removal of the carrier from the carrier holder. The lock disengages when the unit arrives at its destination. In some embodiment, an operator may disengage the lock by inputting the appropriate code. Additional carrier holders may be provided to hold additional carriers. For example, a second carrier holder may be disposed on the base to hold a second carrier. In other embodiments, a carrier frame may be provided to support a second carrier holder above the first carrier holder. Providing other arrangements for holding the carriers may also be useful.

In another embodiment, a jig (not shown) may be provided to adapt the carrier holder to hold a white box which is used to contain wafers for shipping and storage. The white box is smaller in dimension than the carrier. The jig provides support for transporting a white box.

In some embodiment, a frame 450 may be disposed on the base surrounding the carrier holder(s) to form a carrier compartment 465. In the case where a carrier frame exists, the carrier holder and frame may be integrated. The compartment may be an open compartment defined by the frame. In other embodiments, the compartment may be an enclosed compartment. The enclosed compartment may include a compartment door which is opened for loading and unloading and closed for transporting. Transport units with an enclosed compartment, for example, may be employed for inter-fab transfers. In some embodiments, the compartment may be a partially enclosed compartment. Other configurations of compartments may also be useful.

The U/L and transport units are employed to facilitate automated transfers of carriers within the manufacturing facility. In one embodiment, the U/L units are intended to be employed for localized movement of carriers. For example, localized movement includes intra-bay transfers, transfers within a section of a production area or transfers within a limited distance. For example, the upper distance threshold of travel for the U/L units may be limited to about 240 meters. Other upper distance thresholds may also be useful. The threshold distance may depend on operational requirements, such as speed of the U/L units and U/L transport time limits. The transport units, on the other hand, are intended for movement involving longer distances in the manufacturing facility. For example, the transports are intended for inter-bay and inter-fab transports as well as transports of distances greater than the upper distance threshold for U/L units. The use of different types of units provides flexibility in movement of carriers in the manufacturing facility. Depending on need, U/L units may be employed under certain situations for movements involving longer distances. Other configurations of movements of carriers by the transport and U/L units may also be useful. In some cases, the transport unit may be employed to push or tow racks.

The number of U/L and transport units in the transport system may be selected appropriately based on the layout of the production area or areas. In one embodiment, the number of units may be optimized to minimize non-transport time of the U/L and transport units. For example, the units idle and charge time are minimized. This ensures maximum utilization of the transport and U/L units. It is understood that the number of U/L units need not equal the number of transport units. The optimization may be determined by simulations using parameters based on, for example, operational requirements.

Some exemplary operational requirements of the U/L and transport units are provided in Table 1.

TABLE 1

| Common U/L Unit and Transport Unit Operational Requirements | |
|---|---|
| Speed | Min ≈ 1-1.2 meter/second |
| Battery operational/charge ratio | Min ≈ 5:1 |
| Battery Life | Min ≈ 1 year |
| Changeable battery | |
| Safety | Alarm or warning indicator |
| | Object detection and avoidance |
| Command interface | Display sub-unit |
| | Input sub-unit |
| Clean room compatible | Class 100 |
| Indexer Detection | Indexer identification and alignment |
| Navigation | Mapping of manufacturing facility |
| Communications | Production control system |
| | U/L and Transport Units |
| | Tag reader |
| Non-common Transport Unit Operational Requirements | |
| Carrying Payload | Min ≈ 25 Kilograms |
| Non-common U/L Unit Operational Requirements | |
| Carrying Payload | Min ≈ 12 Kilograms |
| Robot System | Min Payload ≈ 12 Kilograms |
| | Min four degrees of freedom of movement |
| | Min height movement ≈ 0.7-1.2 meter |
| | Min positional accuracy ≈ 0.1 millimeter |
| | Load/Unload cycle ≈ 30 seconds |

By providing a transport system which includes U/L and transport units which are AGVs improves transport performance. For example, transfer times may be reduced compared to, for example, OHT systems. Furthermore, the AGVs increase transfer flexibility. For example, different types of transfer may be effected using any combination of U/L and transport units. Such flexibility can lead to improved efficiency as well as reduced transfer time. Moreover, the use of U/L and transport units reduces the need for human interaction in the production area, thereby reducing human error and labor costs. As such, higher throughput, yields and efficiency can be achieved, all leading to lowered production costs and increased revenues.

FIGS. 3a-e show various types of transfers 303a-e in a production area utilizing an embodiment of the transport system. The transfers are between a first location (Location A) to a second location (Location B). The locations include machines, which may include any combination of tools, stockers and WIP racks. Additionally, the locations may, in some instances, include units, such as U/L and transport units. For example, in the case of a direct transfer between tools, Location A and Location B include tools. For the case of an indirect transfer between tools, one location includes a tool while the other includes a machine which is not a tool. For example, the non-tool machine maybe a stocker or a WIP rack. In some cases, an indirect transfer may involve non-tool machines at both locations, such as any combination of stockers and/or racks.

Figure 3A:
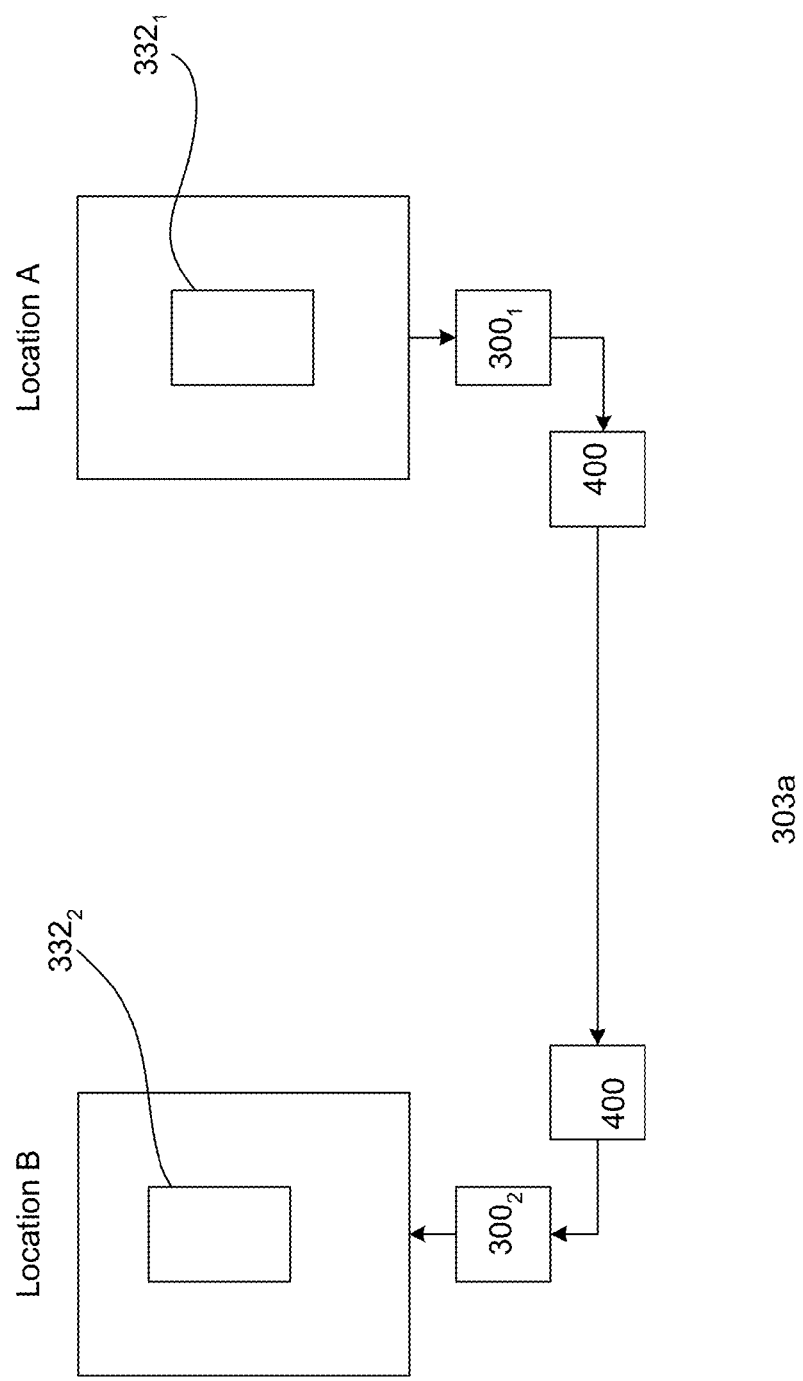

As shown in FIG. 3a, a first U/L unit $300_1$ unloads a carrier from a port $332_1$ at Location A. As discussed, Location A may be a tool, stocker or rack. The U/L unit may read the carrier ID to make sure that it is the correct carrier to be unloaded from Location A. The carrier is loaded onto a transport unit 400. The transport unit proceeds to transport the carrier to location B. Depending on the transfer, Location B may be a tool or a non-tool machine, such as a stocker or a WIP rack. A second U/L unit $300_2$ unloads the carrier from the transport unit and loads it into port $332_2$ at Location B. The port, for example, may be a port of a tool, a port of a stocker or a position of a WIP rack, such as on a smart tray. The U/L unit may check the carrier ID to ensure that it is the correct carrier to unload from the transport unit and load into the port. As described, the transfer involves a first U/L unit passing a carrier to a transport unit and a second U/L unit retrieving the carrier from the transport unit.

In one embodiment, the U/L and transport units are capable of communicating with each other. For example, the U/L may receive an indication from the transport unit that it has arrived at the destination and is ready for unloading or loading by the U/L unit. When the U/L unit completes its task, it may inform the transport unit so that it can depart. The U/L and transport units may also communicate with the production control system, informing it of their status.

Figure 3B:
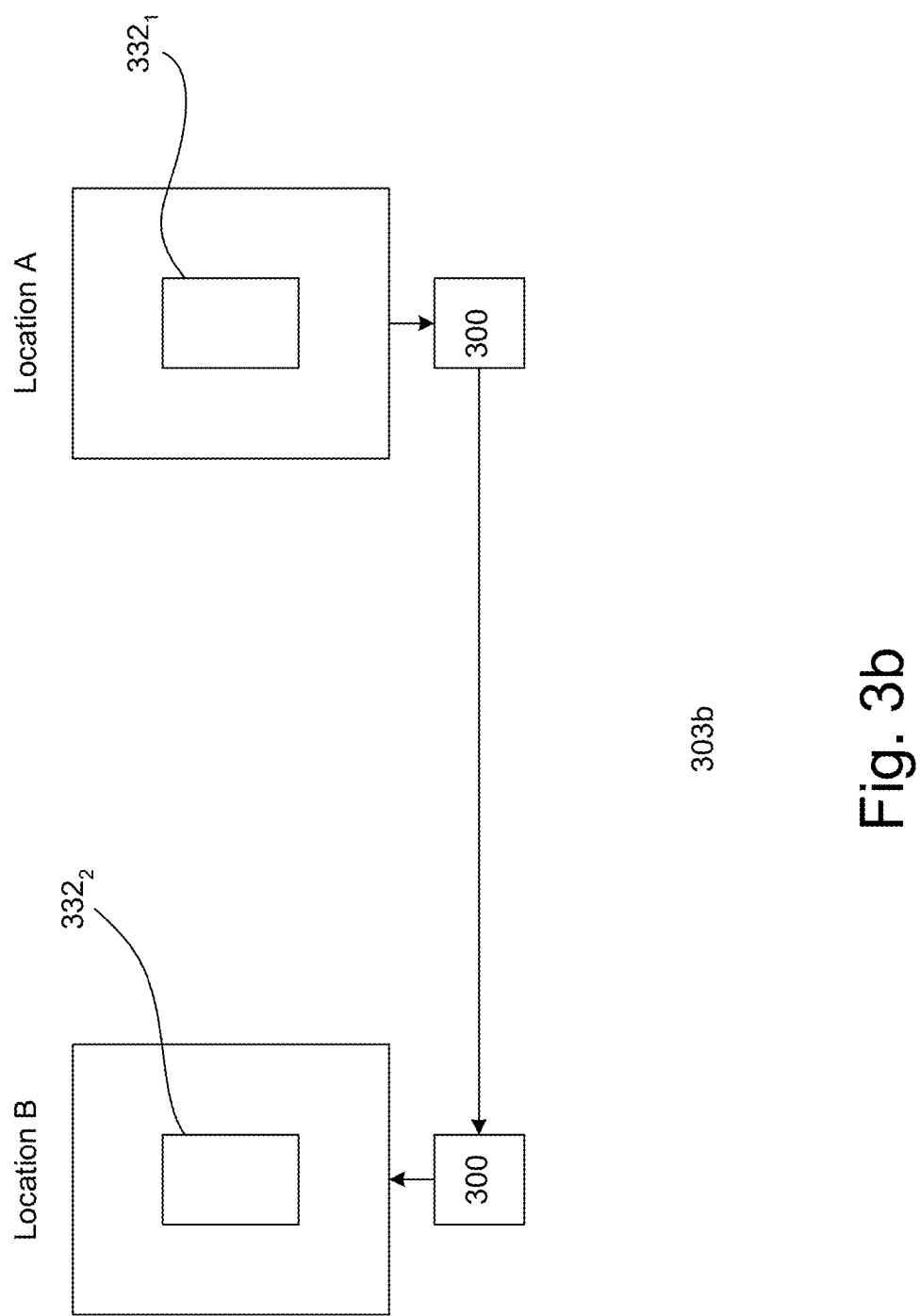

In FIG. 3b, a U/L unit 300 unloads a carrier from a port $332_1$ at Location A. The U/L may read the carrier ID to make sure that it is the correct carrier to be unloaded from Location A. The U/L unit proceeds to Location B with the carrier where it unloads the carrier to port $332_2$. The U/L unit may be used to transfer a carrier from Location A to Location B. This provides added flexibility in the transfer of carriers from one location to another.

FIG. 3c shows another type of transfer from Location A to Location B. Similar to FIG. 3a, a first U/L unit $300_1$ unloads a carrier from a port $332_1$ at Location A. The U/L unit may read the carrier ID to make sure that it is the correct carrier to be unloaded from Location A. The carrier is loaded onto a transport unit 400. The transport unit proceeds to transport the carrier to location B. Unlike FIG. 3a, an operator unloads the carrier from the transport unit and loads it into port $332_2$ at Location B. The use of an operator provides added flexibility in the transfer of carriers form Location A to Location B.

Figure 3D:
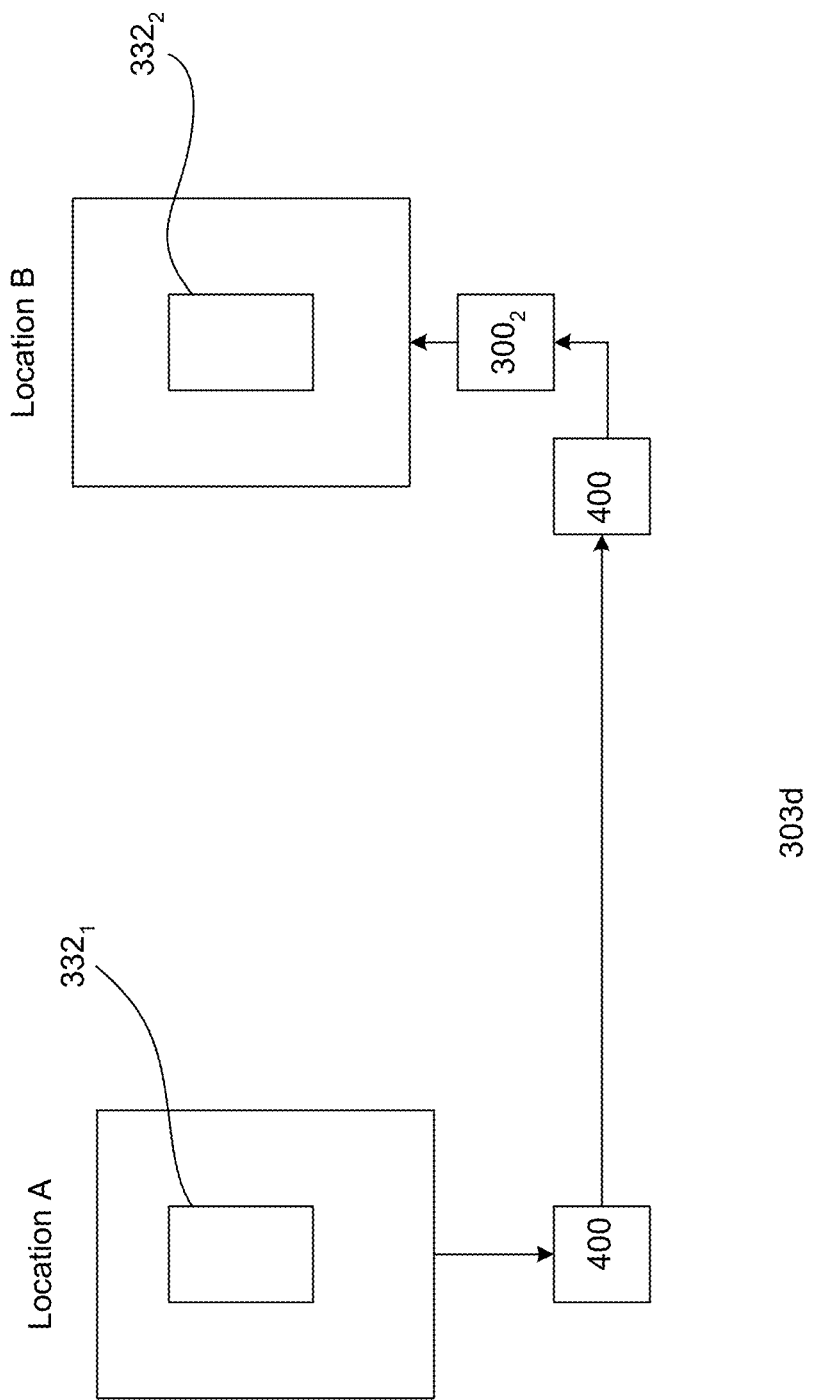

FIG. 3d shows another type of transfer from Location A to Location B. The transfer is similar to that shown in FIG. 3c except that an operator is employed to load the carrier from port $332_1$ onto a transport unit 400 at Location A and a second U/L unit $300_2$ is used to unload the carrier from the transport unit and load it into port $332_2$. In another embodiment, operators may be used to load and unload the carriers at Location A and Location B, as shown in FIG. 3e.

In addition, other types of transfers may be employed. In some cases, a transfer may involve a transfer between two U/L units. This type of transfer may be particularly useful for U/L units which can hold two carriers. For example, a first U/L unit may be dispatched to a second U/L unit to take over possession of the carrier from the first U/L unit. In other embodiments, a U/L unit may be dispatched to a transport unit and take over possession of a carrier from the transport unit.

As discussed, the production area may include sub-areas on different planes or levels. A rack may be employed to facilitate transfer of carriers from one level to another. In one embodiment, a rack may be disposed on the upper level at about the step. To transfer from one level to another, a first U/L on one level unit loads the rack which is then picked up by a second U/L unit on another level. The first U/L unit may be on the lower level and the second U/L unit may be on the upper level to effect a transfer from the lower level to the upper level. Alternatively, the first U/L unit may be on the upper level and the second U/L unit may be on the lower level to effect a transfer from the upper level to the lower level.

Figure 4:
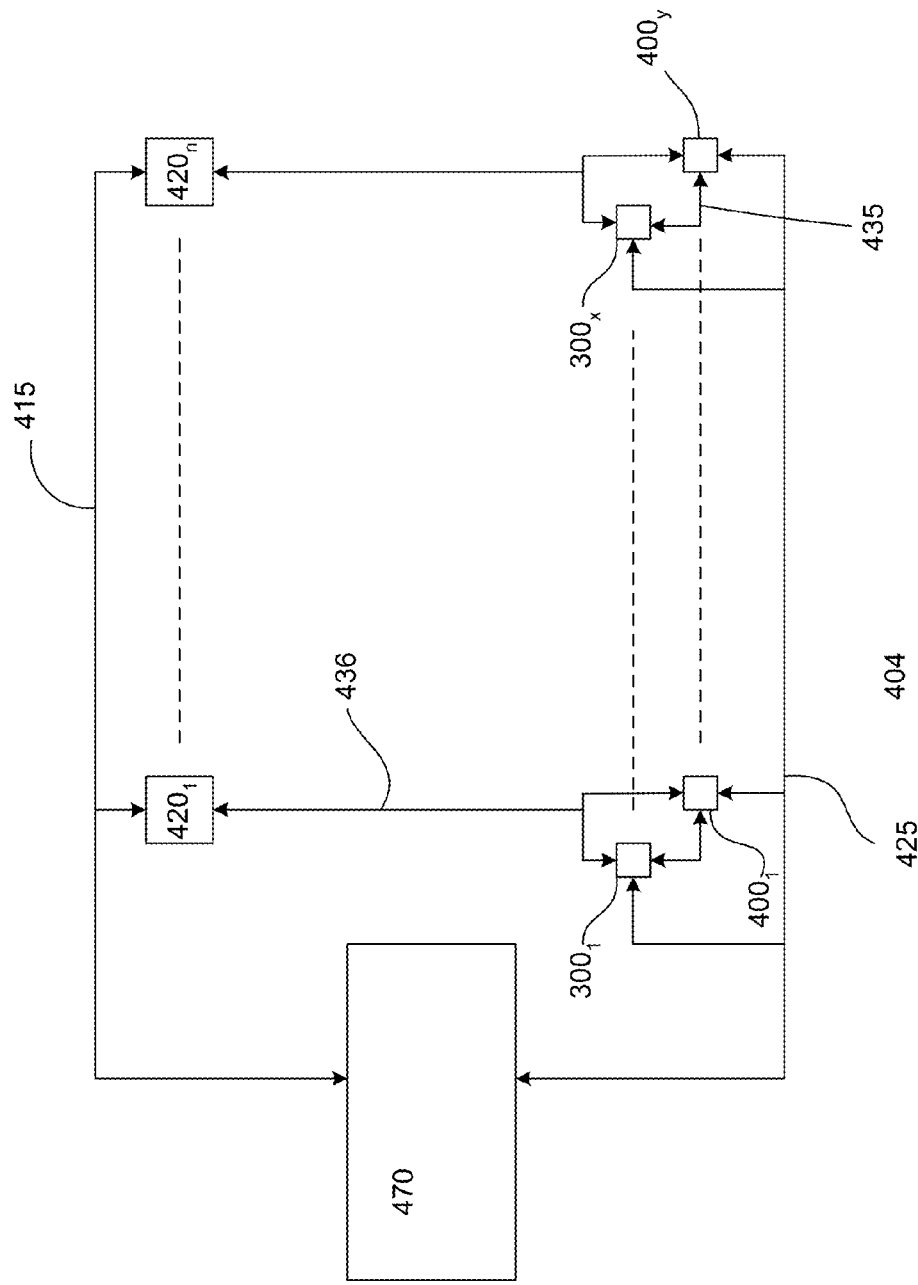
FIG. 4 shows an embodiment of a computer controlled production area.

FIG. 4 shows a simplified diagram of an embodiment of a computer controlled production area 404. As shown, the production area includes a production control system 470 which controls the manufacturing process for forming semiconductor devices. Producing other types of devices may also be useful. Devices, for example, are formed on wafers or substrates. A group of wafers (lot) is processed together. The wafers of a lot are contained in a carrier, such as a pod, to facilitate handling and movement through the manufacturing process. Each wafer is associated with a wafer ID and each carrier is associated with a lot ID. The wafers in a lot are assigned to a carrier. The production control system can enable the manufacturing process to be fully automated or partly automated as required.

The production control system, for example, includes one or more computer systems executing computer programs which cooperates together to control the manufacturing process. The production control system, for example, tracks and controls the flow of wafers from the start to the end of the process. The status of each wafer, such as lot information, stage of processing and location is maintained by the production control system.

The production control system controls the flow of carriers to different machines $420_{1-n}$ in the production area. Machines may include, for example, tools, stockers and WIP racks. Machines may also include other components of the manufacturing facility which includes an ID. The machines may be grouped in bays. The bays may be disposed in one or more fabs. Other arrangements of machines may also be useful. A tool may include a machine control program, such as a machine supervisory program (MSP), to control the operation of the tool. The production control system, in one embodiment, communicates with the tools. For example, the production control system communicates with the MSPs of the tools. The communication between the tools and production control system may be bi-directional, as indicated by arrow 415. The tools may also be in communication with each other. By communicating with the tools, the production control system identifies which tools are ready (tool readiness), which is used to determine the flow of carriers.

The production control system also controls a transport system having a plurality of U/L units $300_{1-x}$ and transport units $400_{1-y}$. It is understood that n and x need not be equal. The U/L and transport units facilitate automated transfer of carriers in the production area. A U/L unit includes a robot system for handling and transporting carriers while a transport unit transports carriers. Each unit is provided with a tag which stores the unit ID. The tag may also include information relating to the lot which the unit is handling or transporting, such as but not limited to next recipes, stage of production, and wafer quantity.

The production control system communicates with the units to facilitate the transfer of carriers. The communication, for example, is a two-way communication, indicated by arrow 425. To facilitate communication with the production control system, communication interfaces may be provided for the AGV units. The production control system may instruct the appropriate AGV units to initiate a transfer. For example, when a machine (e.g., at Location A) completes or is about to complete processing of a lot of wafers, MSP informs the production control system. The production control system determines the next destination (e.g., at Location B) of the lot. The production control system instructs the transport system to effect the transfer of the lot from Location A to Location B. This may involve just the U/L unit or both U/L and transport units.

In one embodiment, the communication between the various components of the manufacturing facility is a smart communication system. For example, each U/L and transport units may be in direct or indirect communication with each machine as well as with each other, as indicated by arrows 435 and 436. Indirect communication may be facilitated by, for example the production control system. The communication system, in one embodiment, is a wireless communication system which includes Wi-Fi transponders. For example, the tools, U/L units and transport units are provided with Wi-Fi transponders. In other embodiments, the communication system may be a hybrid communication which includes both wireless and wired communication links.

Figure 5:
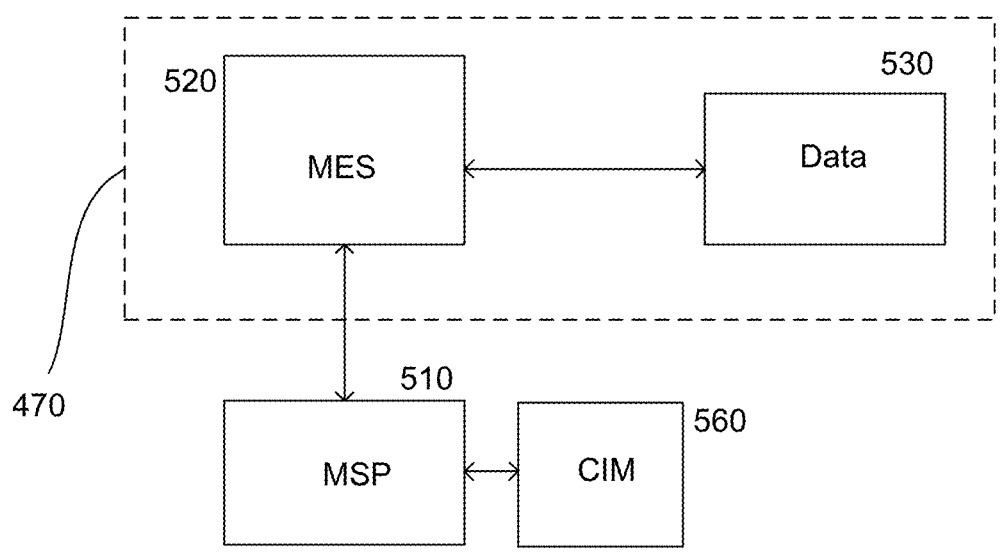
FIG. 5 shows an embodiment of a production control system.

FIG. 5 shows an embodiment of a production control system 470. The production control system, in one embodiment, includes a manufacturing execution system (MES) 520. The MES communicates with a data unit 530. The data unit contains all data related to the manufacturing process, such as wafer IDs, recipes, tools, locations of tools, as well as other information related to the manufacturing process. In addition, the data includes tool indexers and chamber IDs of tools. This locks indexers to their respective tools. The MES tracks the overall execution or operations in the production area. The MES may also perform functions associated with the production facility, such as tracking the location of carriers, tracking status of equipments or tool readiness, performing lot reservations and putting lots on hold. For example, the MES communicates with the MSP 510 of the tools to determine tool readiness.

The MES contains an inventory list of the lots in the production area and information concerning the lots such as lot priority and dispatching lot sequence. The MES also includes a lot list of work in progress for a tool, including perhaps priority ranking of the lots. Based on the lot list, the MES determines the next destination for lots which have been processed by a tool and ready to be removed therefrom. The next destination may depend on the priority status of a lot as well as availability of tools to perform the next process for the lot.

The MES issues instructions to the U/L and transport units to initiate transfer of carriers based on the identified next destinations. In one embodiment, the units may be provided with interface which enables seamless communication with the MES and other applications. In one embodiment, definitive instructions to the units are issued to initiate a transfer. For example, a definitive instruction includes an instruction for transferring a specific lot to a specific tool at about a specific time (e.g., +/−buffer).

A CIM interface 560 may be provided to enable an operator to communicate with the MSP. In some embodiments, the CIM communicates indirectly with the MSP via the indexer of the tool. The CIM also facilitates indirect communication with the MES through the MSP. For example, an operator may request dispatching of units by the MES through the CIM.

In some embodiments, the functions of the MES may be distributed to additional sub-systems of the manufacturing control system. For example, the production control system may include a material control system (MCS) for dispatching units and real time dispatcher (RTD) for providing the lot list. Additional sub-systems may also be included in the production control system.

Figure 6:
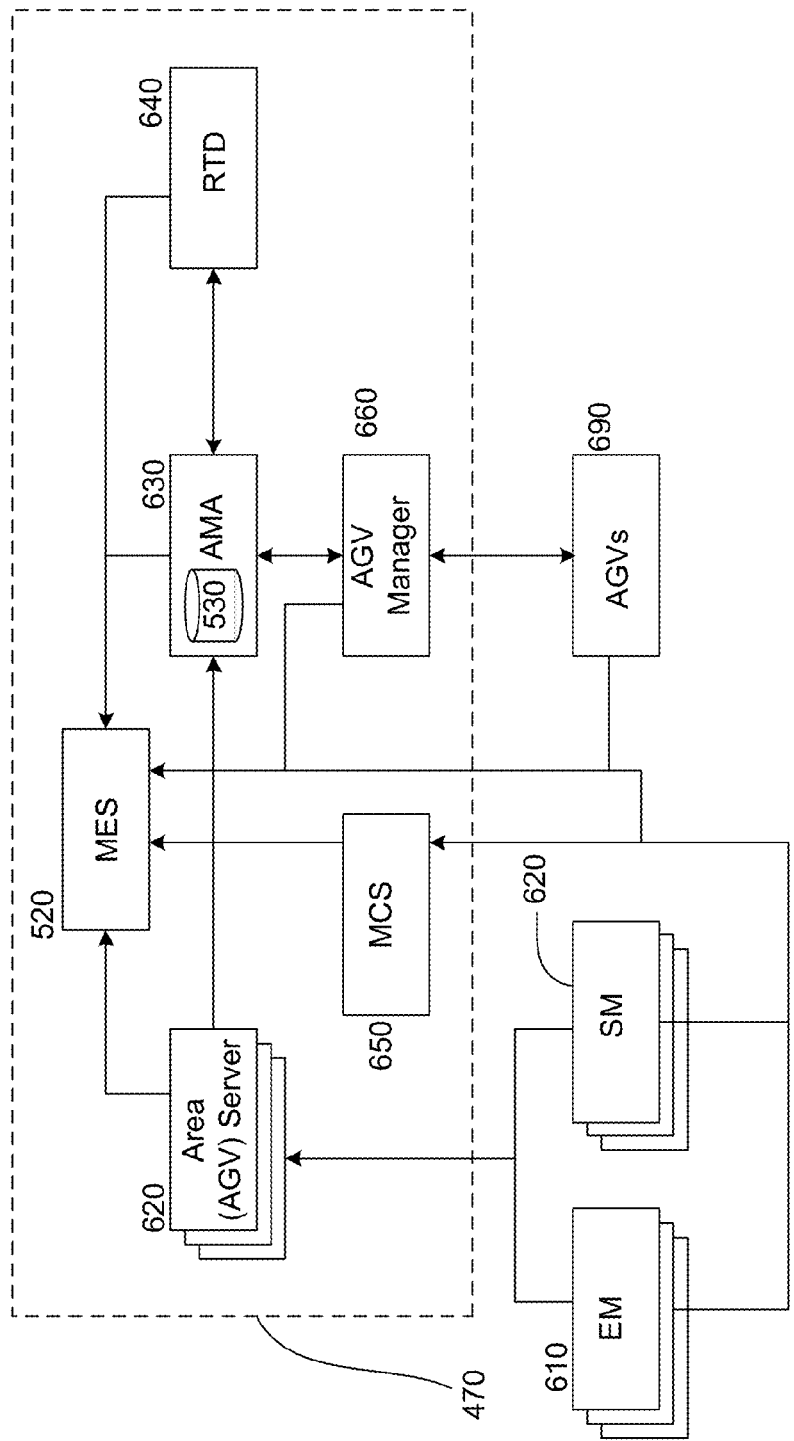
FIG. 6 shows the architecture of an embodiment of a manufacturing system for controlling movement of materials in a production facility.

FIG. 6 shows the architecture of an embodiment of a manufacturing system 600 for controlling movement of materials in a production facility. The manufacturing system includes a production control system 470. The production control system, in one embodiment, controls the movement of carriers or pods containing wafers in a semiconductor manufacturing facility. The production control system, for example, employs AGVs 690, which may include U/L and transport units, to move pods to and from tools and storage locations.

The manufacturing system may have a client/server (C/S) architecture. For example, the various components of the production control system are servers which may be accessed by different clients. Each component may be a separate server. A server may be a computer which includes a memory and a processor. The server is configured to transmit, receive, process and store information or data associated with the production control system. Various types of computers may be employed. For example, the computer may be a mainframe, workstation, as well as other types of processing devices. The server may be adapted to execute any operating system. For example, the operating system of the server may be an Oracle-based OS, Linux-Intel, Linux/390, UNIX, Windows Server. Other types of operating systems may also be used. A server may be loaded with one or more software applications associated with the production control system.

The memory of the server may include any memory or database module. The memory may be volatile or non-volatile types of memories, such as magnetic media, optical media, random access memory (RAM), read-only memory (ROM), removable media, or any other suitable local or remote memory component.

A client may be a local or remote computing device with a local memory and a processor. The memory may include fixed and/or removable storage media such as a magnetic computer disk, CD-ROM, or other suitable media. Various types of processing devices may serve as a client. For example, the client may be a PC, tablet PC, workstation, network computer, kiosk or personal data assistant (PDA). Other types of processing devices may also be used. The processing devices may include a memory and a processor. Input and output devices may be provided for the processing device. The input device may be, for example, a keypad, touch screen, mouse, or other device that can accept information from a user. For example, a client may receive requests from a user using the input device. The output device may be a display to convey information to a user. Other types of input and output devices may also be useful. The clients can receive, transmit, process and store any appropriate data associated with the manufacturing system.

A user interface may be provided in a client for a user to interface with an environment. The user interface may be a graphical user interface (GUI). A GUI may provide an efficient and user-friendly manner of presenting information or communicating with the environment. For example, a GUI may include a task menu as well as one or more panes for displaying information. Other types of user interfaces, such as command line interface (CLI), may also be useful. The type of user interface may depend on the type of application running on the client. For example, the front end portion may include a GUI to enable a user to interact with the back end portion to access data or run programs stored in the server.

The various components of the manufacturing system are coupled by a communication network. The communication network, for example, may be a local area network (LAN) which interconnects the different modules. The communication network may be a wired network, a wireless network or a combination thereof. The modules communicate in the communication network using various communication protocols. For example, the modules may communicate using TCP/IP, Oracle MessageQ (OMQ), and DMQ as well as other protocols or a combination of different communication protocols.

The production control system, for example, controls the movement of pods from one location (location A) to another (location B) using AGVs. A location may be a tool or a storage location. For example, a transfer may be between tools, between a tool and a storage location or between storage locations. A tool can be any tool used in semiconductor processing. For example, a tool may be a lithography tool, heating tool, etch tool, deposition tool, polishing tool, or an ion implantation tool. Other types of tools may also be included. As for the storage location, it may be a WIP rack. A WIP rack may include a plurality of storage slots or trays, serving as storage buffers for transfers between tools. Other types of storage locations, such as stockers may also be included. A transfer may include more than one AGV. For example, a transport unit is employed to move between locations while a U/L unit for load and unload purposes. Other configurations of transfers may also be useful.

As discussed, WIP racks serve as buffers. For example, WIP racks include a plurality of trays which hold pods for transfers to and from tools. In one embodiment, a WIP rack may serve as an IN buffer holding a pod which is to be transferred to a tool or an OUT buffer which holds a pod after processing by a tool. A WIP rack is mapped to one or more tools. For example, a WIP rack is dedicated to one or more tools. A WIP rack is located in proximity to the tools it is dedicated. In one embodiment, separate IN and OUT WIP racks are dedicated to one or more tools. Providing WIP racks which serve as both IN and OUT buffers may also be useful. For example, the pod from the tool is stored in a tray of the WIP rack which serves as an IN buffer. The pod is then moved to another tray in the WIP rack which serves as an OUT buffer. Alternatively, the pod remains in the tray, but the tray is then changed to an OUT buffer tray. Providing a combination of dedicated and non-dedicated IN and OUT buffers may also be useful.

In one embodiment, a load transfer, which is loading a pod into a tool, includes loading the pod from an IN buffer to which the tool is mapped. For example, the pod is transferred from the IN buffer (e.g., Location A) to the tool (e.g., Location B). An unload transfer, which is unloading a pod from a tool includes unloading the pod and transferring it to an OUT buffer to which the tool is mapped. For example, the pod is transferred from the tool (e.g., Location A) to the OUT buffer (e.g., Location B). After the transfer to the OUT buffer (e.g., Location A), the pod may be transferred to an IN buffer (e.g., Location B) associated with the next processing tool. As such, the transfer from a first tool to a second tool is an indirect transfer.

In some cases, the transfer between the OUT and IN buffers is an indirect transfer. For example, a first transfer is performed to move the pod from the OUT buffer (e.g., Location A) to a stocker (e.g., Location B) and then a second transfer is performed to move the pod from the stocker (e.g., Location A) to the IN buffer (e.g., Location B). The use of a stocker may be employed for long distance transfers. Additional transfers, such as between stockers, may be included between the OUT and IN buffers. Other configurations of transfers may also be useful.

In one embodiment, the production control system includes a MES module 520, an area or AGV server module 620, an activity manager automation (AMA) module 630, a real time dispatcher (RTD) module 640, a material control system (MCS) module and an AGV manager module 660. The production control system may include other modules.

As shown, the area server module communicates with the tools and storage locations. In one embodiment, equipment managers (EMs) 610 and storage managers (SMs) are provided to facilitate communication with the area server module. An EM is associated with a tool and a SM is associated with a storage location. An SM may be similar to an EM. In some instances, an SM may be referred to as an EM. Other configurations of EMs, tools, SMs and storage locations may also be useful. A SM or EM, for example, may be a computer with memory. Other types of SMs or EMs may also be useful.

In one embodiment, the SMs update the area server module with pod information. For example, pod information includes pod state of a pod, such as pod arrival and pod removal from the storage location. For example, the area server module listens to pod information from the SMs. The SMs may also perform read/write operations on the smart tag and querying information from the MES to update smart tags. In one embodiment, the SMs communicate with the area server module using OMQ. Communication between the SMs and area server module using other communication protocols may also be useful.

The EMs, in one embodiment, may include an MSP which controls the operations of a tool. For example, an EM may include an MSP which controls the operations of its associated tool. An MSP, for example, includes different recipes which are to be run on a tool. Different EMs may contain different MSPs and recipes, depending on the type of tool.

The EMs issue load and unload requests to the area server. For example, an EM issues a load request when it is ready to process a new lot of wafers or an unload request when a current lot is finished processing. For example, a load request may be issued by an EM when there is no pod in the loader on unload request when a lot has completed processing. Issuing load and unload requests may be based on other factors. For example, the issuance of load and unload requests may be based on anticipatory requesting. In anticipatory requesting, a request may be issued prior to actual need and take into account of travel time. Anticipatory request, for example, may be employed to reduce equipment down or idle time. Issuing load and unload requests based on other techniques may also be useful. The EMs also update the area server with pod information. For example, the area server module listens to pod requests from the EMs.

As shown, the area server module includes a plurality of area servers. For example, in the case where a production facility is separated into areas, an area server may be associated with an area. The area server communicates with EMs and SMs in its associated area. Providing an area server module having one server may also be useful. Other configurations of the area server module may also be useful.

The EMs and SMs, as shown, also communicates with the MCS module. Communication with the MCS module, for example, is achieved using DMQ. Using other communication protocols may also be useful. In one embodiment, the EMs and SMs update the MCS with lot location information. This enables the MCS module to track the lot or pod location. The area server module communicates with the AMA module. Communication between the area server and AMA module may be by TCP/IP. Communicating using other communication protocols may also be useful. The AMA module includes an AMA database 530. The AMA database may include various tables to track information related to the production facility. In one embodiment, the AMA database includes tables containing lot requests, lot locations, tool and storage location mapping as well as other information.

In one embodiment, load requests from the area server are updated in the AMA database. For example, a load request includes the equipment requesting a pod to be loaded. The AMA module, upon receiving a load request, requests a dispatching lot list from the RTD module. The lot list, for example, includes a list of available lots for processing by the tool issuing the load request. The lots of the list are ranked on priority. For example, higher priority lots will be ranked higher versus lower priority lots. Ranking may be based on, for example, business rules. The business rules may be defined by the manufacturer and are used to determine lot priority. Ranking based on other types of rules may also be useful. The AMA module selects a lot to be dispatched to the requestor.

In one embodiment, the AMA module selects an available lot with the highest priority or rank to transfer to the requestor. The AMA issues a dispatch request to the AGV manager to effect the transfer of the selected pod to the requestor. For example, the AGV manager instructs one or more AGVs to effect the transfer from the pod's current location (e.g., Location A) to the requestor (e.g., Location B). In one embodiment, the selected lot is located at an IN buffer (e.g., Location A) associated with the requesting tool. The AGV manager causes an U/L unit to move the selected pod from the IN buffer (e.g., Location A) to the requesting tool (e.g., Location B). The area server validates the lot ID of the selected lot from the EM of the requestor after arrival.

In other embodiment, batch dispatching of lots may be employed. For example, more than one lot may be dispatched by the AMA. Batch dispatching may be useful, for example, in the case where the requestor has more than one load ports which require pods or where a requestor can process multiple lots via a single load port. Batch dispatching may be used for other purposes.

In one embodiment, unload requests from the area server are updated in the AMA database. For example, an unload request includes the equipment requesting a pod to be unloaded. The AMA module, upon receiving an unload request, instructs the AGV manager to unload the lot from the requesting tool. In one embodiment, processed pods are unloaded to an OUT buffer associated with the requestor. The AGV manager instructs an U/L unit to unload the processed pod from the requesting tool (e.g., Location A) and move it to the OUT buffer (e.g., Location B). Other types of unload transfers may also be useful.

The AGV manager module communicates with the AGVs to manage their activities. Upon a job request from the AMA, the AGV manager module creates a job for transferring the specified lot from its present location (e.g., Location A) to the destination location (e.g., Location B). For example, a job ID associated with the job is created. The AGV manager issues a command to one or more AGVs to fulfill the job. In one embodiment, the AGV manager instructs an U/L unit to transfer a lot from the requestor to the OUT buffer for an unload request or a lot from the IN buffer to the requestor for a load request. Other types and configurations of transfers may also be useful.

The area server module updates the AMA module with status of the job. For example, the area server module listens for status updates from the EMs. This may include, for example, lot arrivals and lot removals. The area server, for example, provides the information for updating the table in the AMA database related to transfer job status. The AMA module, as discussed, serves to maintain transport records and status of pod requests and location of lots dispatched. Pod states are also tracked by the AMA module. Additionally, dispatch rules are also maintained by the AMA module to determine destination locations.

The MES module serves as hub of the production control system. In one embodiment, the MES module is a PROMIS MES from Brooks Software. Other types of MES modules may also be useful. The MES tracks lot information and tool status in the production facility. Tracking of tool status or lot information may be achieved by communication with various components of the manufacturing system. The MES may also track other information of the manufacturing system. In one embodiment, the MES communicates with the various modules of the production control system and the EMs and SMs.

The manufacturing system includes various components with communication links. The described communication links are exemplary. It is understood that the communication links may include intermediate components, providing indirect communication between components. Other configurations of the production system may also be useful. For example, the EMs and SMs communicate with the area server module and it updates the MCS module.

The EMs communicate with the area server module. The EMs provide messages to the area server module. In one embodiment, the EMs provide request messages to the area server module. The request messages, in one embodiment, include load and unload pod messages. Formats of embodiments of load and unload request messages are shown in Table 1a below:

TABLE 1a

|  | Load Request | Unload Request |
| --- | --- | --- |
| MSGID | Message id | Message id |
| EQUID | Equipment id | Equipment id |
| ARMID | Arm id | Arm id |
| PODLOC | Location | Location |
| PODTYPE | Pod type | Pod type |
| AREA | Area name | Area name |
| RCP | Process recipe | N/A |

The fields of the messages are provided in the column direction. The fields are capitalized. The MSGID field includes the transaction identifier. The EQUID indicates the equipment. The ARMID indicates the loader which is associated with the tool. The PODLOC identifies the location of the pod. The PODTYPE field indicates the type of pod. For example, the type of pods can include a production pod (e.g., PW) with production wafers, a test pod (e.g., TW) with test wafers, an empty pod (e.g., MT) with no wafers, a pod with an empty cassette (e.g., CS) with a cassette with no wafers, and a fill monitor pod (e.g., FM). The AREA field indicates which area server. The RCP field indicates the process recipe of the lot. Providing other types of pods may be also useful.

The request messages may also include batch messages. An embodiment of a format of the batch message is shown in Table 1b below:

TABLE 1b

|  | Batch Request |
| --- | --- |
| MSGID | Message id |
| EQUID | Equipment id |
| AREA | Area name |
| 1STLOT | Pod type |

The fields of the message are provided in the column direction. The fields are capitalized.

The request messages may also include reset messages. The reset message is sent when the EM is restarted or reset. Resetting the EM, for example, may be manually performed by an operator or a user. An embodiment of a format of a reset request message is shown in Table 1c below:

TABLE 1c

|  | Reset Request |
| --- | --- |
| MSGID | Message id |
| EQUID | Equipment id |
| ARMID | Arm id |
| PODLOC | Location |
| AREA | Area name |

The fields of the messages are provided in the column direction. The fields are capitalized.

The EMs may also provide other messages to the area server. For example, the EMs may provide pod information messages, such as pod fail and pod state messages. An embodiment of a format of a request message is shown in Table 1d below:

| ARMID | Arm id | Arm id |
| --- | --- | --- |
| PODLOC | Location | Location |
| PODTYPE | Pod type = null | Pod type = null |
| AREA | Area name | Area name |
| STATE | N/A | State = arrived or removed |
| LOT ID | Lot id | Lot id |
| RCP | Process recipe | N/A |
| ERRCODE | Error code | N/A |
| ERRMSG | Error message | M/A |

The fields of the messages are provided in the column direction. The fields are capitalized. For PODTYPE, it is equal to null when the lot information is not yet available. The STATE field indicates whether the pod has arrived or has been removed, depending on whether it is with respect to a load or an unload request message. The LOT ID field identifies the selected lot. The RCP field is the process recipe. The ERRCODE is the error code while ERRMSG field is the error message. The EMs may also provide other types of messages.

As discussed, the AMA database includes various tables. In one embodiment, the AMA database includes an EM Request Table, an EM Request History Table, a Pod Location Table, a Reserve Lots Table, an AGV Manager Transport Record Table, an Enterprise Manager Transport History Table and an Equipment and WipRack Mapping Table. Providing other tables may also be useful.

The EM Request Table stores all current pod requests from the area server module. The EM Request History Table stores the history of all pod requests from the area server module. The Pod Location Table stores pod location information. The Reserve Lots Table stores information related to lots which are reserved. Reserved lots cannot be assigned. This avoids multiple jobs assigned for one lot. The AGV Manager Transport Record Table stores the status of current transport commands while the AGV Manager Transport History Table stores status of all transport commands. As for the Equipment and WipRack Mapping Table, it contains the mapping data of In/Out WIP racks and tools. For example, it maps which In/Out WIP rack serves which tool or tools. The mapping may depend on physical location.

The AMA database may include other tables. For example, the AMA database may include AGV-AMA Request, Dispatched Lot and Exceptional Tables. The AGV-AMA Table contains records of current job requests from the AMA. The Dispatched Lot Table contains records of dispatched lots while the Exceptional Table contains records of errors related to dispatches. Providing other tables in the AMA database may also be useful.

FIGS. 7a-i shows exemplary embodiments of the various tables in the AMA database. Referring to FIG. 7a, the structure of an EM Request Table 701a is shown. The name of the table, for example, may be AGV_POD_REQUEST. The EM Request Table contains records of current pod requests. In one embodiment, a record indicates the status at a location which can contain a pod, such as a tool or a WIP rack.

The structure of a record includes a plurality of rows 711 and columns 741. In one embodiment, a record includes six columns. A row corresponds to a field and a field has six components, corresponding to the number of columns. A header row 712 is provided to include names of the columns in the record. The value of a field is provided in Column. The characteristics of the field in Column is provided in Source, Type, Size and Null columns while a description of the available values may be provided in the description column. Source indicates the origin of the data in Column, Type indicates the type of data in Column, Size indicates the length of the data in Column, and Null indicates whether the Column can be empty or requires data or that the data is unique (PK).

In one embodiment, a record includes 11 fields. The fields are POD_LOC, STATE, EQPT_ID, ARM_ID, POD_TYPE, AREA, RECIPE, LOT_ID, REQUEST_TIME, and STATUS_TIME fields. Providing other fields may also be useful. POD_LOC indicates a location which can contain a pod. For example, a location can be a tool or a WIP rack. REQUEST indicates the type of request. For example, the request may be a load request (REQ_LOAD), unload request (REQ_UNLOAD). STATE indicates whether a pod has arrived or has been removed from the location. EQPT_ID is the identifier associated with the tool or WIP rack. ARM_ID is the identifier associated with the loader at a tool. POD_TYPE is the type of pod transfer. AREA is the area server associated with the location. RECIPE is the process recipe of the lot of wafer in the pod. LOT_ID is the identifier of the lot in the pod. REQUEST_TIME is when the request was issued. STATUS_TIME indicates the time the record was last updated.

In one embodiment, the number of records in the EM Request Table is equal to the number of available pod locations. Records in the EM Request Table are changed when the location issues a request. For example, appropriate records are updated with EMs issue a load or unload request.

FIG. 7b shows the structure of an EM Request History Table 701b. The name of the table may be AGV_POD_RE-QUEST_HIST. The EM Request History Table contains records of all pod requests. For example, this table contains records of all changes or updates to the EM Request Table. The structure of a record in the EM Request History Table is similar to that of the EM Request Table. Common elements will not be explained or explained in detail. The structure includes a plurality of rows 711 and columns 741. A header row 712 provides names of the data in the table in the column direction. The EM Request History Table includes an additional field, which is the Command field. The Command field indicates whether the EM Request Table has been changed. For example, changes are listed as UPDATE. Depending on the table, the Command field may have other values, such as INSERT and DELETE. For example, INSERT and DELETE are used tables that create and delete records.

FIG. 7c shows an AGV-AMA Request Table 701c. The AGV-AMA Table contains records of current job requests from the AMA. The name of the AGV-AMA Table may be AGV_AMA_REQUEST. The structure of a record of the AGV-AMA Request Table is similar to that of the Tables already described. Common elements will not be explained or explained in detail. The structure includes a plurality of rows 711 and columns 741. A header row 712 provides names of the data in the table in the column direction. The AGV-AMA Table includes an additional row of data related to job id (JOB_ID). The job id is created by the AMA when a request for a pod transfer is received. Additional fields may also be included. For example, the AGV-AMA Table may also include a STATUS field. The STATUS field indicates the status of the request, such as pending, processing or abort. In other embodiments, the status of the request may also be integrated into the STATE field. For example, the STATE field may also indicate the status of the request, such as pending, processing or abort.

FIG. 7d shows an AGV-AMA Request History Table 701d. The AGV-AMA History Table contains records of all job requests from the AMA. The name of the AGV-AMA Request History Table may be AGV_AMA_REQUEST_HIST. The structure of a record of the AGV-AMA Request History Table is similar to that of the AGV-AMA Request Table. Common elements will not be explained or explained in detail. The structure includes a plurality of rows 711 and columns 741. A header row 712 provides names of the data in the table in the column direction. The AGV-AMA Request History Table includes an additional row of data related to the Command field.

FIG. 7e shows an AGV Transport Record Table 701e. The AGV Transport Record Table contains records of current jobs by the AGV manager. The name of the AGV Transport Record Table may be AGV_JOB. The structure of the records of the AGV Transport Record Table is similar to that of the tables already described. Common elements will not be explained or explained in detail. The structure includes a plurality of rows 711 and columns 741. A header row 712 provides names of the data in the table in the column direction. The AGV Transport Record Table includes JOB_ID, JOB_STATUS, FROM_LOC, FROM_EQPT, TO_LOC, TO_EQPT, STATUS, LOT_ID, POD_TYPE, AREA, ZONE, HANDLER_ID, JOB_TIME and STATUS_TIME fields.

The JOB_STATUS field indicates the status of the job, whether is it completed or opened. The FROM_LOC and FROM_EQPT fields indicate the ids of the arm loader and equipment the pod is currently at. The TO_LOC and TO_EQPT fields indicate the id of the arm loader and equipment the pod is to be delivered. The STATUS field indicates the status of the job performed by the AGV. The ZONE field indicates the zone or location which the tool is located. The HANDLER_ID field indicates the AGV used in the transport. The JOB_TIME field indicates when the job was sent to the AGV manager by the AMA module. The STATUS_TIME indicates the last update of the status.

In some embodiments, the AMA database may include an AGV Transport Record History Table (not shown). The AGV Transport Record History Table contains records of all jobs by the AGV manager. The name of the AGV Transport Record History Table may be AGV_JOB_HIST. The structure of the records of the AGV Transport Record History Table is similar to that of the AGV Transport Record Table as well as other tables already described. For example, the AGV Transport Record History Table may include a Command field.

FIG. 7f shows a Reserve Lots Table 701f. The Reserve Lots Table contains records of reserve lots. The name of the Reserve Lots Table may be AGV_AMA_LOT_RESERVE. Lots which are reserved cannot be used for other jobs. This avoids lot conflicts. The structure of the records of the Reserve Lots Table is similar to that of the tables already described. Common elements will not be explained or explained in detail. The structure includes a plurality of rows 711 and columns 741. A header row 712 provides names of the data in the table in the column direction. The Reserve Lots Table includes LOT_ID, POD_LOC, and RESERVED_TIME fields. The RESERVED_TIME field is a timestamp of when the lot was reserved.

FIG. 7g shows a Dispatched Lot Table 701g. The Dispatched Lot Table contains records of dispatched lots. The name of the Dispatched Lot Table may be AGV_LOT. The structure of the records of the Dispatched Lot Table is similar to that of the tables already described. Common elements will not be explained or explained in detail. The structure includes a plurality of rows 711 and columns 741. A header row 712 provides names of the data in the table in the column direction. The Dispatched Lot Table includes LOT_ID, LOT_TYPE, LOCATION, STATUS, AREA, RECIPE, TIMESTAMP, RESERVED_BY, and RESERVED_TIME fields. The STATUS field indicates the status of the lot. The RESERVED_BY field indicates which tool reserved the lot and RESERVED_TIME is the time of the reservation.

FIG. 7h shows an Exceptional Table 701h. The Exceptional Table contains records of all errors which were detected. For example, the errors may relate dispatches as well as processing errors. The name of the Exceptional Table may be AGV_FAIL. The structure of the records of the Exceptional Table is similar to that of the tables already described. Common elements will not be explained or explained in detail. The structure includes a plurality of rows 711 and columns 741. A header row 712 provides names of the data in the table in the column direction. The Exceptional Table includes LOT_ID, EQPT_ID, RECIPE, ERR_CODE, ERR_MSG and TIMESTAMP fields.

FIG. 7i shows an Equipment and WipRack Mapping Table 701i. The Equipment and WipRack Mapping Table contains records indicating which tools are linked to which WIP racks. The name of the Equipment and WipRack Mapping Table may be AGV_EQPT_MAP. The structure of the records of the Equipment and WipRack Mapping Table is similar to that of the tables already described. Common elements will not be explained or explained in detail. The structure includes a plurality of rows 711 and columns 741. A header row 712 provides names of the data in the table in the column direction. The Equipment and WipRack Mapping Table includes EQPT_ID, POD_LOC, IN_OUT, AREA and ZONE fields. The IN_OUT field indicates whether the WIP rack serves as a IN buffer (IN), an OUT buffer (OUT) or both (BOTH)

As previously discussed, there may dedicated input (IN) and output (OUT) storage buffers. For example, there are dedicated WIP racks which are dedicated as IN buffers and OUT buffers. The WIP racks serve as buffers to keep dispatched lots. For example, IN buffers are used to store lots ready to run in a tool while OUT buffers are used to store lots that have completed processing. The use of IN and OUT buffers can shorten AGV travel distance and time. For example, buffers are located near the tools. The buffers update the MCS with locations of the pods they store.

Figure 8A:
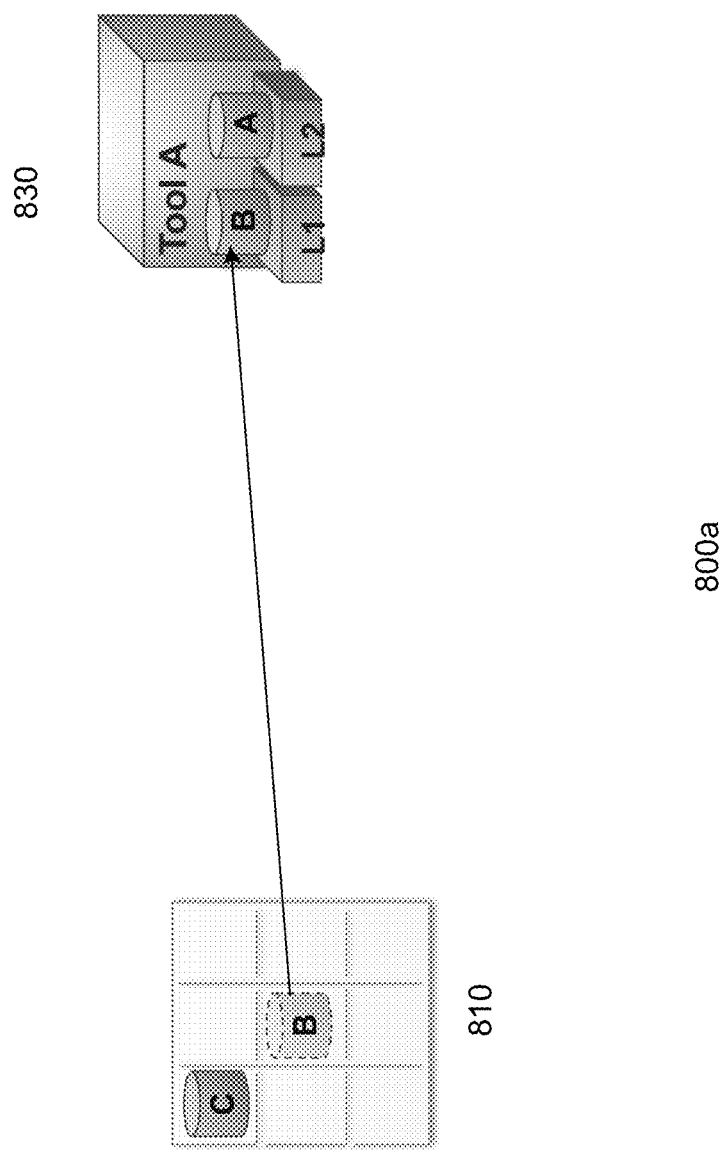
FIGS. 8a-b show an embodiment of the use of IN and OUT buffers.
Figure 8B:
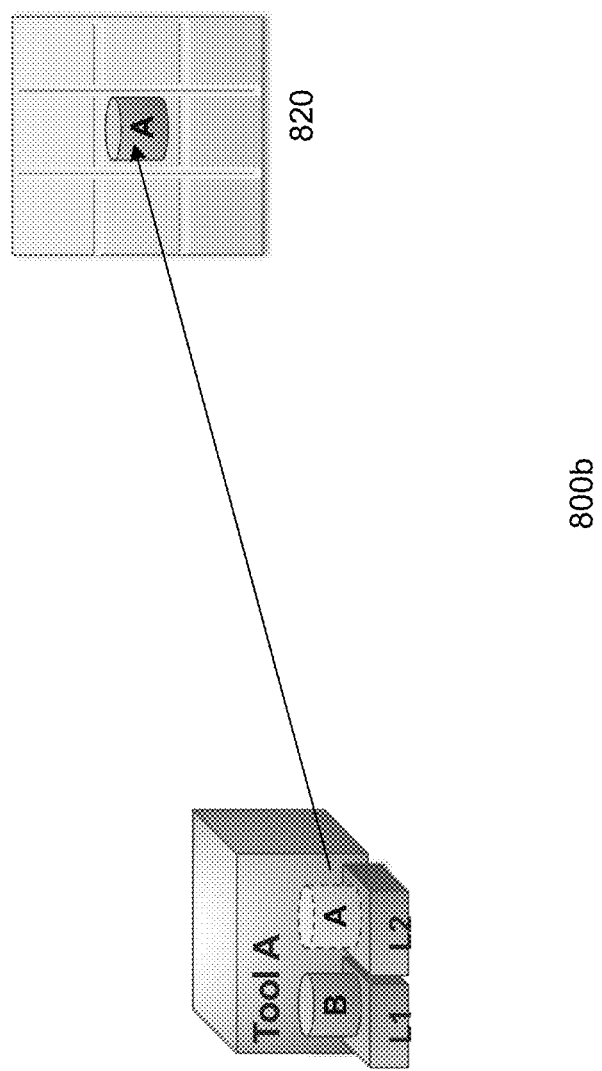

FIGS. 8a-b illustrate an embodiment of the use of IN and OUT buffers. Referring to FIG. 8a, a diagram 800a illustrating the use of an IN buffer 810 is shown. The IN buffer stores pods ready to run in a tool. The IN buffer may be located near a tool or a set of tools. For example, pods stored in the IN buffer may be run in a tool 830 (Tool A) which is located in its proximity. As shown, the IN buffer contains pods B and C. Tool A includes load ports L1 and L2. Pod A is loaded into L2 of Tool A. The EM of Tool A issues a load request, for example, for L1. The AMA selects Pod B to be loaded from IN buffer to L1. The AGV manager controls one or more AGVs to effect the transfer of pod B to L1.

Referring to FIG. 8b, a diagram 800b illustrating the use of an OUT buffer 820 is shown. The OUT buffer stores pods which have completed processing. The OUT buffer may be located near a tool or a set of tools. For example, pods stored in the OUT buffer may be located in proximity of the tools which processed it. As shown, Tool A includes load ports L1 and L2. Pod A has completed processing. The EM of Tool A issues an unload request for pod A at L2. The AMA issues instructions to the AGV manager to effect the transfer of pod A to the OUT buffer.

Figure 8C:
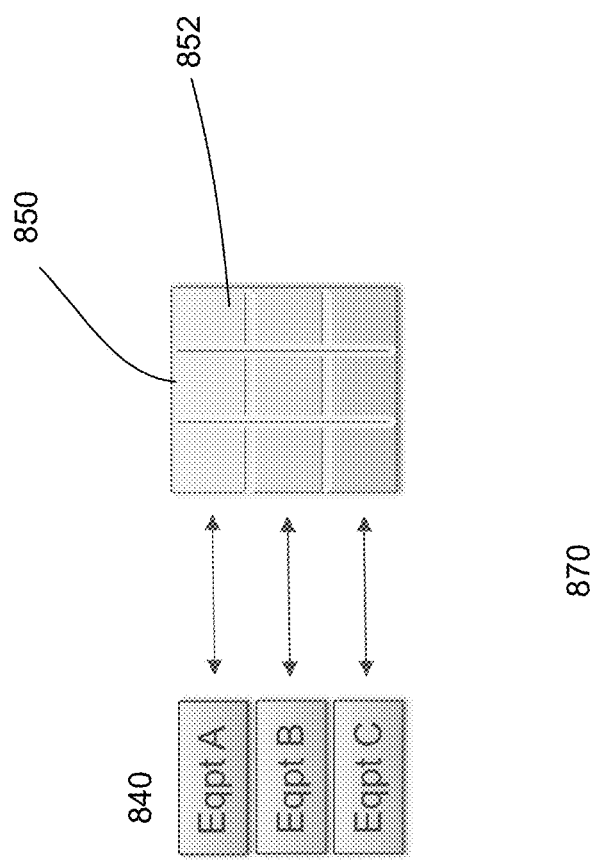
FIG. 8c shows an embodiment of a mapping configuration.

FIG. 8c illustrates mapping 870 in accordance to one embodiment. As shown, a buffer 850 includes a plurality of slots 852. For example, the buffer includes nine slots. Providing buffers of other sizes may also be useful. Illustratively, three tools 840 are assigned to the buffer. For example, equipment A, equipment B and equipment C are assigned to the buffer. The tools are mapped to the buffer via the mapping table, as described in FIG. 7i. Other mapping configurations may also be useful.

In one embodiment, the AMA may be configured to handle batch dispatching. In batch dispatching, the AMA dispatches a plurality of pods in one dispatch. For example, a loader may receive multiple lots, one after another, such that multiple lots are loaded into a tool for processing. Batch processing is useful, for example, when a tool includes multiple loaders or can handle multiple lots. Other types of batch dispatching may also be useful.

The ranking of destinations by the RTD module may be based on dispatch rules. The dispatch rule includes multi-level constraints. In one embodiment, the dispatch rules include 3 constraint levels. The first constraint level (e.g., Constraint Level 1) takes into account recipes defined in the tool. The second constraint level (e.g., Constraint Level 2) takes into account device, process, stage, recipe, customer and lot. For example, the more matches to the constraint checks, the higher the ranking. The third constraint level (e.g., Constraint Level 3) takes into account chamber-level match. For example, the third level constraint employs matching by EQPT_ID. In the case of multi-chamber tools, the chamber to process the lot may not be available. The additional Constraint Level 3 matching avoids dispatching to a tool having a chamber which cannot process the lot. This improves cycle time due to inaccurate dispatching.

In one embodiment, the first and second constraint levels are performed by the RTD to provide the lot list with rankings. For example, the RTD identifies all available lots which qualify or passes under the first constraint level. The lots are then ranked based on the second constraint level. The more matches that a lot has to constraints, the higher the priory ranking. The AMA performs the third constraint level matching in the process of selecting a lot from the lot list. In other embodiments, the RTD may perform all constraint level matching.

Figure 9A:
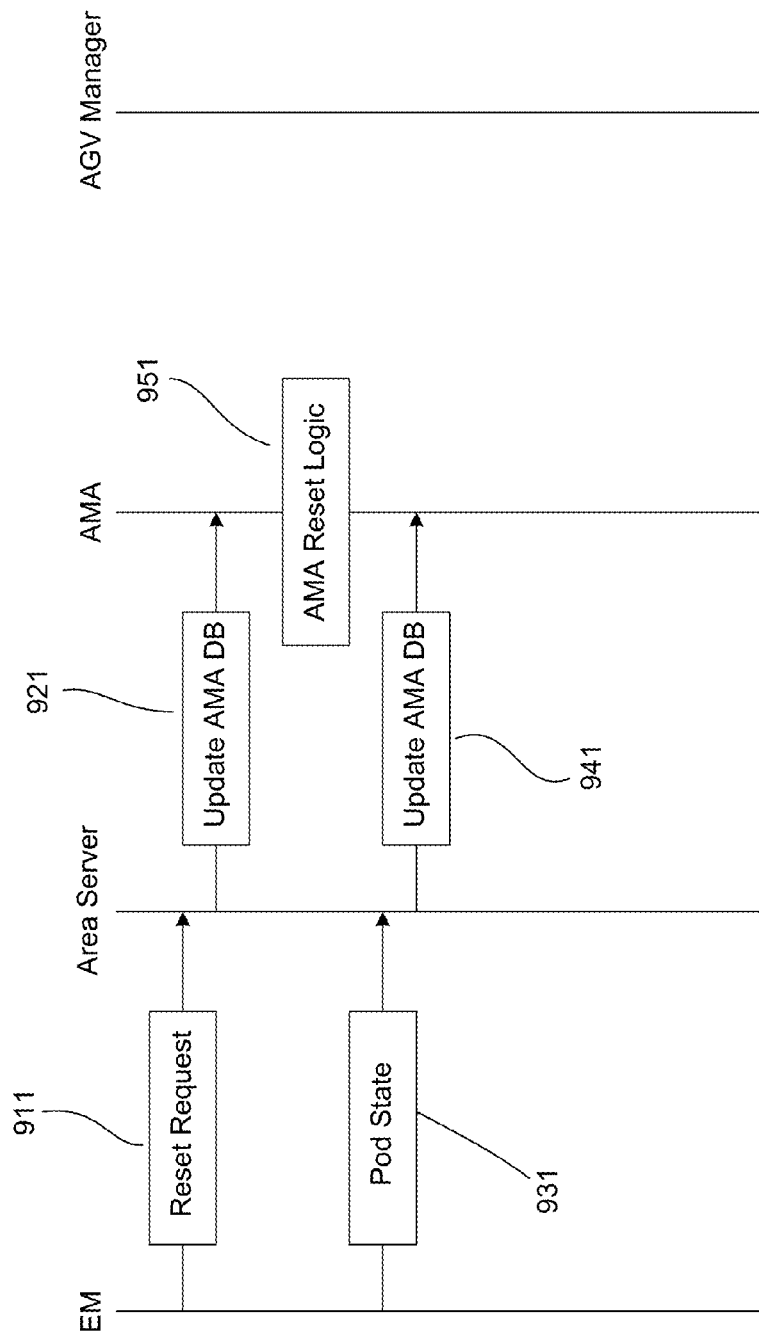
FIGS. 9a-c show trace diagrams of various transactions.
Figure 9B:
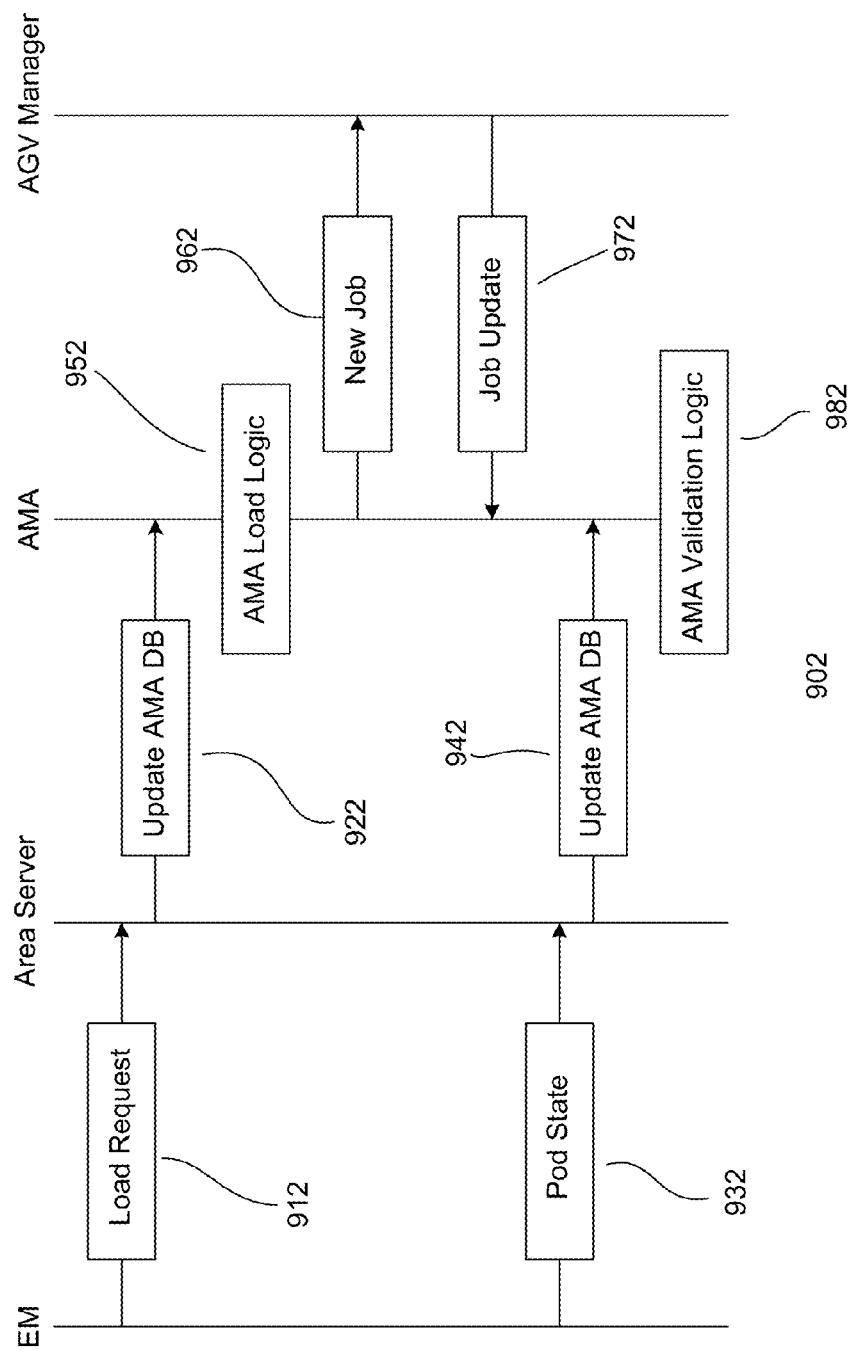
Figure 9C:
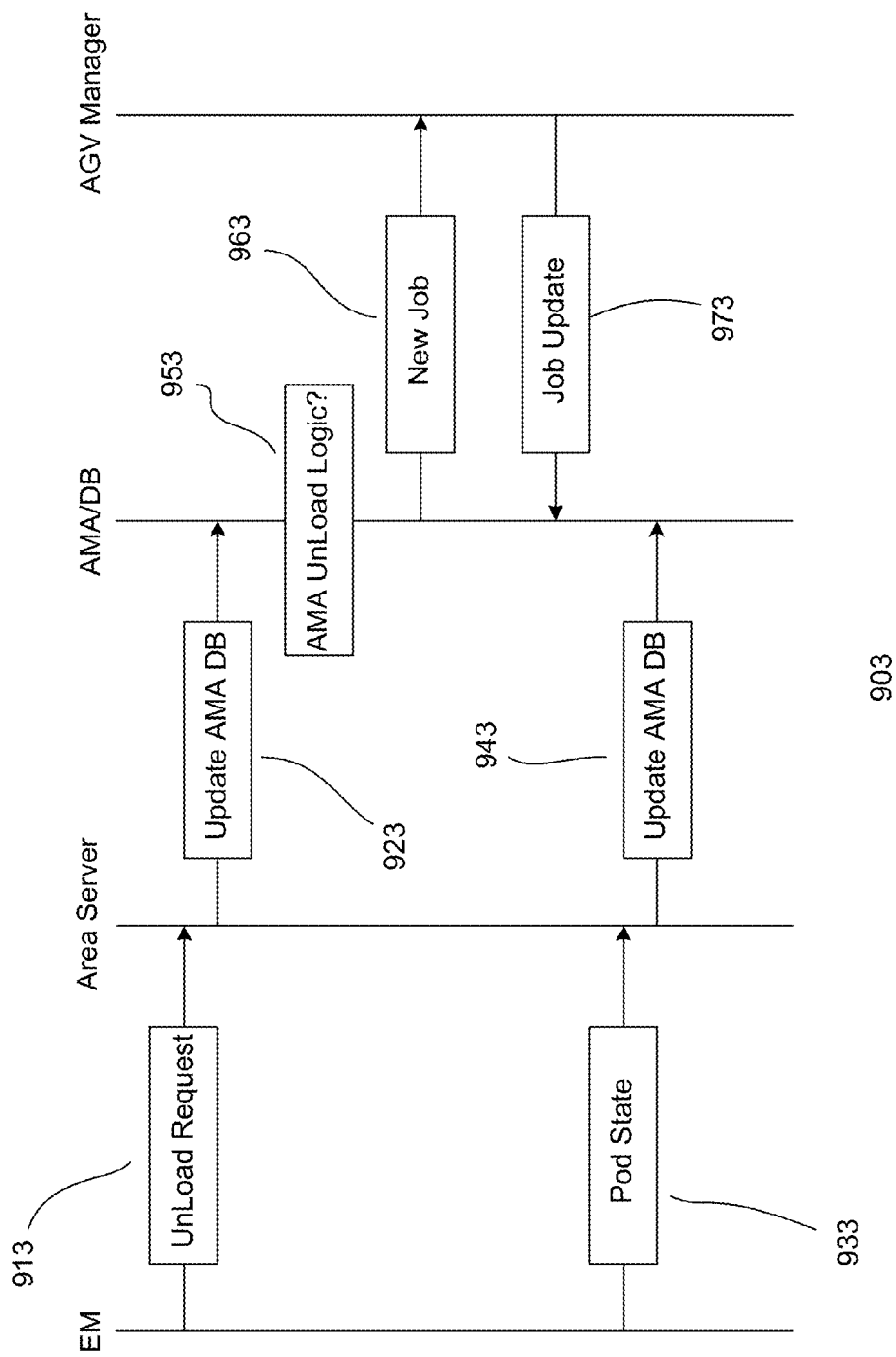

FIGS. 9a-c show embodiments of trace diagrams of various requests. Referring to FIG. 9a, a trace diagram 901 of a reset request is shown. An EM issues a reset request 911 to the area server module. The reset request is issued by the EM when it is initialized. For example, the reset request is issued when the EM is switched on. Initializing the EM at other times may also be useful. The area server module updates the AMA database 921. The AMA performs reset logic 951 when the AMA database is updated with the reset request.

The EM issues a pod state message 931. The area server module updates the AMA database 941. The pod state message is sent to the AMA after it has been reset.

Referring to FIG. 9b, a trace diagram 902 of a load request is shown. An EM issues a load request 912 to the area server module. The load request is issued by the EM when it needs a lot to process. For example, the load request is issued when the equipment associated with the EM needs a pod at its load port. The area server module updates the AMA database 922.

The AMA performs load logic 952 when the AMA database is updated with the load request. The AMA load logic includes obtaining a dispatch lot list from the RTD module and selecting a lot. The AMA issues a job request 962 to AGV manager to transfer the selected lot to the tool associated with the EM issuing the load request. The AGV manager provides the AMA with a job status update 972. For example, the AGV manager broadcast the status of the job to the AMA. The status includes which AGV has been assigned to the job at what stage of the job the AGV is at.

The EM issues a pod state message 932 to the area server module. The pod state message indicates that the selected pod has arrived at the equipment load pod. The update causes the area server module to perform validation logic 982. This ensures that the pod at the equipment is the selected pod. Once the lot has been validated, the area server module updates the AMA database 942.

Referring to FIG. 9c, a trace diagram 903 of an unload request is shown. An EM issues an unload request 913 to the area server module. The unload request is issued by the EM, for example, when a pod needs to be unloaded at the load port of the tool. The area server module updates the AMA database 923.

The AMA performs an unload logic 953 when the AMA database is updated with the unload request. In one embodiment, the AMA issues a job request 963 to the AGV manager to transfer the lot at the tool associated with the EM issuing the unload request. The lot is transferred to the OUT buffer associated with the requesting tool. The AGV provides the AMA with a job status update 973. The update, for example, is provided when the selected pod is delivered to the destination.

The EM issues a pod state message 933 to the area server module. The pod state message indicates that the pod has been removed from the equipment. The area server module updates the AMA database 943.

Figure 10B:
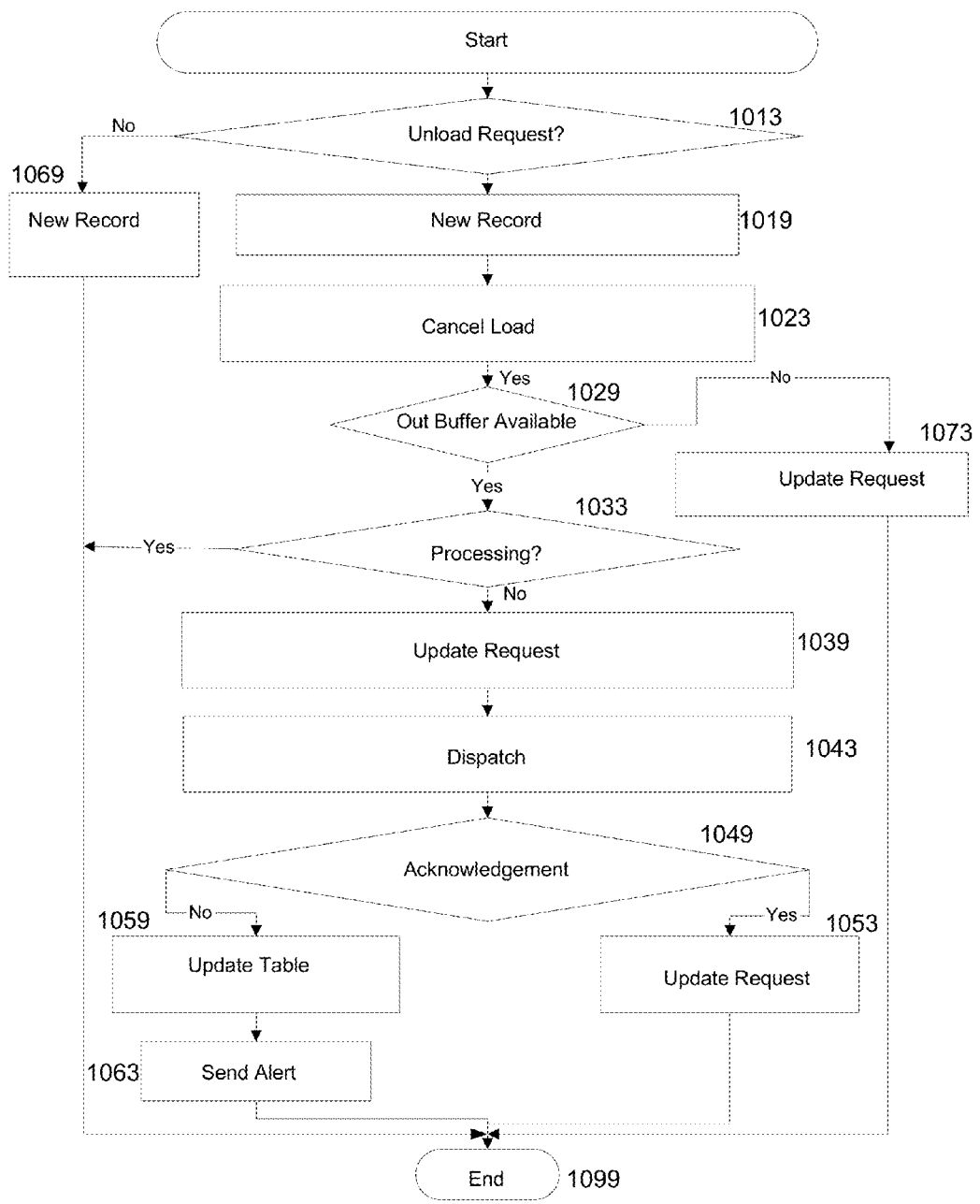

FIGS. 10a-g show various logic performed by the AMA module. FIGS. 10a1 and 10a2 show an embodiment of a load logic 1000a performed by the AMA module. In one embodiment, the load logic is triggered when a load request is issued by the EM. For example, when the EM Request Table of the AMA database is changed to indicate that a load request has been issued by an EM. In one embodiment, the load logic is triggered when the Pod Request Table has fields REQUEST=REQ_LOAD (load request) and POD_TYPE=PR (production lot).

Once triggered, the AMA module determines if there is already a pending or processing load request by the requestor at step 1005. For example, the AMA checks AGV-AMA Table to see if the requestor has a pending or processing load request. A pending or processing load request may be indicated by a record for POD_LOC=requestor having the field REQUEST=REQ_LOAD and the status is pending or processing by the AMA (e.g., status=AMA_Pending or AMA_Processing). Other techniques for determining if the requestor has a pending load request may also be useful.

If a pending or processing load request exists for the requestor, the AMA proceeds to step 1035. At step 1035, the AMA updates the AGV-AMA Table. In one embodiment, updating the table includes inserting a new record which indicates that the request is aborted. The process proceeds to step 1099 for termination of the load logic. On the other hand, if no pending or processing load request is found for the requestor, the process continues to step 1008. At step 1008, the AGV-AMA Table is updated by inserting a new record of the request. The status of the request indicates that the AMA is processing it.

In one embodiment, after the AGV-AMA Table is updated, the AMA cancels any pending or processing AMA unload request from the requestor at step 1010. At step 1015, the states of the loader (e.g., ARM) and tool are determined. The states may be idle or running. If the loader is not idle, the process proceeds to step 1040, where the status of the request is updated to pending. For example, the AGV-AMA table is updated to reflect that the status of the request is pending. The process then terminates at step 1099.

If, on the other hand, at least the state of the loader is idle, the process continues to step 1018. At step 1018, the AMA determines if the idle time of the tool is greater than the maximum allowable idle time. For example, if the tool is idled too long, it cannot process a lot. If the idle time is greater than the maximum idle time, the state of the tool or chamber is updated at step 1038. For example, the AMA updates the MES regarding the state of the tool. The process then continues to step 1040 for request update to pending and process termination at step 1099.

On the other hand, if the idle time is less than the maximum idle time, the AMA requests the RTD for a lot list for the requestor at step 1020. In one embodiment, the lot list includes lots for the requestor with ranking. The lot list ranking, for example, is based on Constraint Level 1 and Constraint Level 2 checking. From the lot list, the AMA determines if the list contains available lots at step 1025. Available lots, for example, are lots which are in the IN buffer associated with the requestor and not reserved by other jobs. For example, available lots are not found in the Reserve Lots Table. If no lots are available, the process continues to step 1040 for updating and process termination at step 1099.

In the case where the lot list includes available lot, in one embodiment, the AMA performs Constraint Level 3 checking at step 1030. For example, the available lots are checked for chamber level matching. If no lots pass Constraint Level 3 checking, the process continues to step 1040 for request status updating the status of the request and process termination at step 1099.

If there are available lots after Constraint Level 3 checking, the highest ranking lot is selected at step 1045 for transfer to the requestor. In one embodiment the AMA, checks to see if the request status is still processing. For example, the AMA checks the AGV-AMA Table to see if the request status is processing. If the status is not processing, the process terminates at step 1099. If the status is processing at step 1048, the AMA reserves the selected lot at step 1050. For example, a new record is created in the RESERVE LOTS Table to reflect that the selected lot is reserved. If the lot reservation is unsuccessful at step 1055, the process returns to step 1045.

On the other hand, if lot reservation is successful, the process continues to step 1058. At step 1058, the AMA updates the AGV-AMA Table to reflect that the status of the request to sending. At step 1060, the AMA issues a dispatch request to the AGV manager to move the selected lot to the requestor.

The AMA waits for an acknowledgement of the dispatch request from the AGV manager at step 1065. For example, the AMA waits for a predetermined time for acknowledgment from the AGV manager. If no acknowledgement is received with the predetermined time (timed out), the process continues to step 1075, where the AGM-AMA Table is updated. For example, the request is updated to reflect that it was timed out. At step 1078, the Reserved Lots Table is updated by deleting the reservation of the selected lot. An alert of the timed out is issued at step 1080. The alert, for example, is issued to an operator or an engineer for checking on why the dispatch is timed out. The process then terminates at step 1099.

If an acknowledgment is received, the AMA updates the AGV-AMA Table to reflect that the request has been sent at step 1068. The selected lot is reserved for transfer by the AGV or AGVs at step 1070. The selected lot is reserved, for example, by the SM holding the selected lot. The process terminates at step 1099.

FIG. 10*b* shows an embodiment of an unload logic 1000*b* performed by the AMA module. In one embodiment, the unload logic is triggered when an unload request is issued by the EM. For example, when the request table of the AMA database is changed to indicate that an unload request has been issued by an EM. In one embodiment, the unload logic is triggered when the Pod Request Table has field REQUEST=REQ_UNLOAD (unload request).

Once triggered, the AMA module determines if there is already a pending or processing unload request by the requestor at step 1013. For example, the AMA checks AGV-AMA Table to see if the requestor has a pending or processing unload request. A pending or processing unload request may be indicated by a record for POD_LOC=requestor has the field REQUEST=REQ_UNLOAD and the status is pending or processing by the AMA (e.g., status=AMA_Pending or AMA_Processing). Other techniques for determining if the requestor has a pending or processing unload request may also be useful.

If a pending unload request exists for the requestor, the AMA proceeds to step 1069. At step 1069, the AMA updates the AGV-AMA Table. In one embodiment, updating the table includes inserting a new record which indicates that the request is aborted. The process proceeds to step 1099 for termination of the unload logic. On the other hand, if no pending or processing unload request is found for the requestor, the process continues to step 1019. At step 1019, the AGV-AMA Table is updated by inserting a new record of the request. The status of the request indicates that the AMA is processing it.

In one embodiment, after the AGV-AMA Table is updated, the AMA cancels any AMA pending or processing load request from the requestor at step 1023. At step 1029, the AMA determines if there are any empty slots or trays in the OUT buffer associated with the requester. If there are no empty trays available in the OUT buffer, the process proceeds to step 1073. At step 1073, the status of the request is updated in the AGV-AMA Table to reflect that it is pending. The process then terminates at step 1099.

If, on the other hand, if there is an empty tray at the OUT buffer, the AMA determines if the status of the request is processing at step 1033. If the status is processing, the process proceeds to step 1099 for termination. On the other hand, if the status is not processing, the process proceeds to step 1039. At step 1039, the AMA updates the AGV-AMA Table to reflect that the request is being sent.

After updating the AGV-AMA table, the AMA sends a dispatch request to the AGV manager to transfer the lot at the requestor to the OUT buffer at step 1043. The AMA waits for an acknowledgement of the dispatch request from the AGV manager at step 1049. For example, the AMA waits for a predetermined time for acknowledgment from the AGV manager. If no acknowledgement is received with the predetermined time (timed out), the process continues to step 1059, where the AGM-AMA Table is updated. For example, the request is updated to reflect that it was timed out. An alert of the timed out is issued at step 1063. The alert, for example, is issued to an operator or an engineer for checking on why the dispatch timed out. The process then terminates at step 1099.

If an acknowledgment is received, the AMA updates the AGV-AMA Table to reflect that the request has been sent at step 1053. The process terminates at step 1099.

Figure 10C:
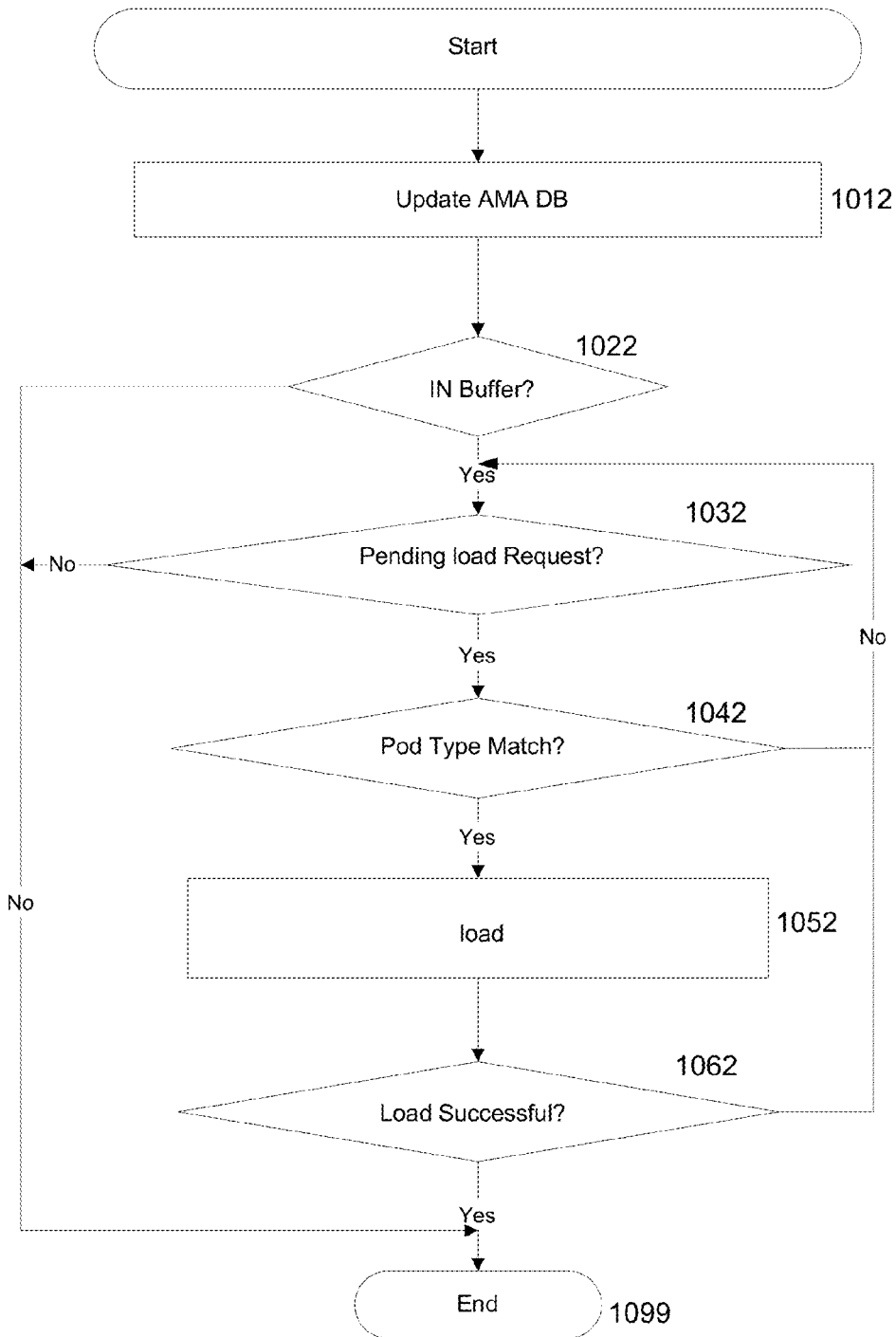

FIG. 10*c* shows an embodiment of a pod arrival at WIP rack logic 1000*c* performed by the AMA module. In one embodiment, the pod arrival logic is triggered when a pod has arrived at a WIP rack. In one embodiment, the arrival logic is triggered when a record in the Pod Request Table has the STATE field changed to ARRIVED (unload request) and POD_LOC is a WIP rack.

Once triggered, the AMA module updates LOT_ID and POD_TYPE fields of the record in the Pod Request Table at step 1012. At step 1022, it determines if the tray of the WIP rack assigned to hold the pod is an IN tray (IN buffer). If it is not, the arrival logic terminates at step 1099. If the tray is an IN tray, the process continues to step 1032. At step 1032, the AMA checks to see if there is a pending load request. For example, the AMA checks the AGV-AMA Table to determine if there is a pending request. For example, this is determined based on the oldest request time and tool id that is mapped to this IN tray. If there is no pending request, the process terminates at step 1099. If there is a pending load request, the process continues to step 1042.

The process, at step 1042, checks the POD_TYPE field to see if the pending request matches the pod type of the arrived pod. If the pod type does not match that of the POD_TYPE field of the pending request, the process returns to step 1032.

If the POD_TYPE field of the pending request matches the pod type of the arrived pod, the AMA triggers a load function at step 1052. If a load successful message is returned to the AMA at step 1062, the process terminates at step 1099. Otherwise, the process returns to step 1032.

Figure 10D:
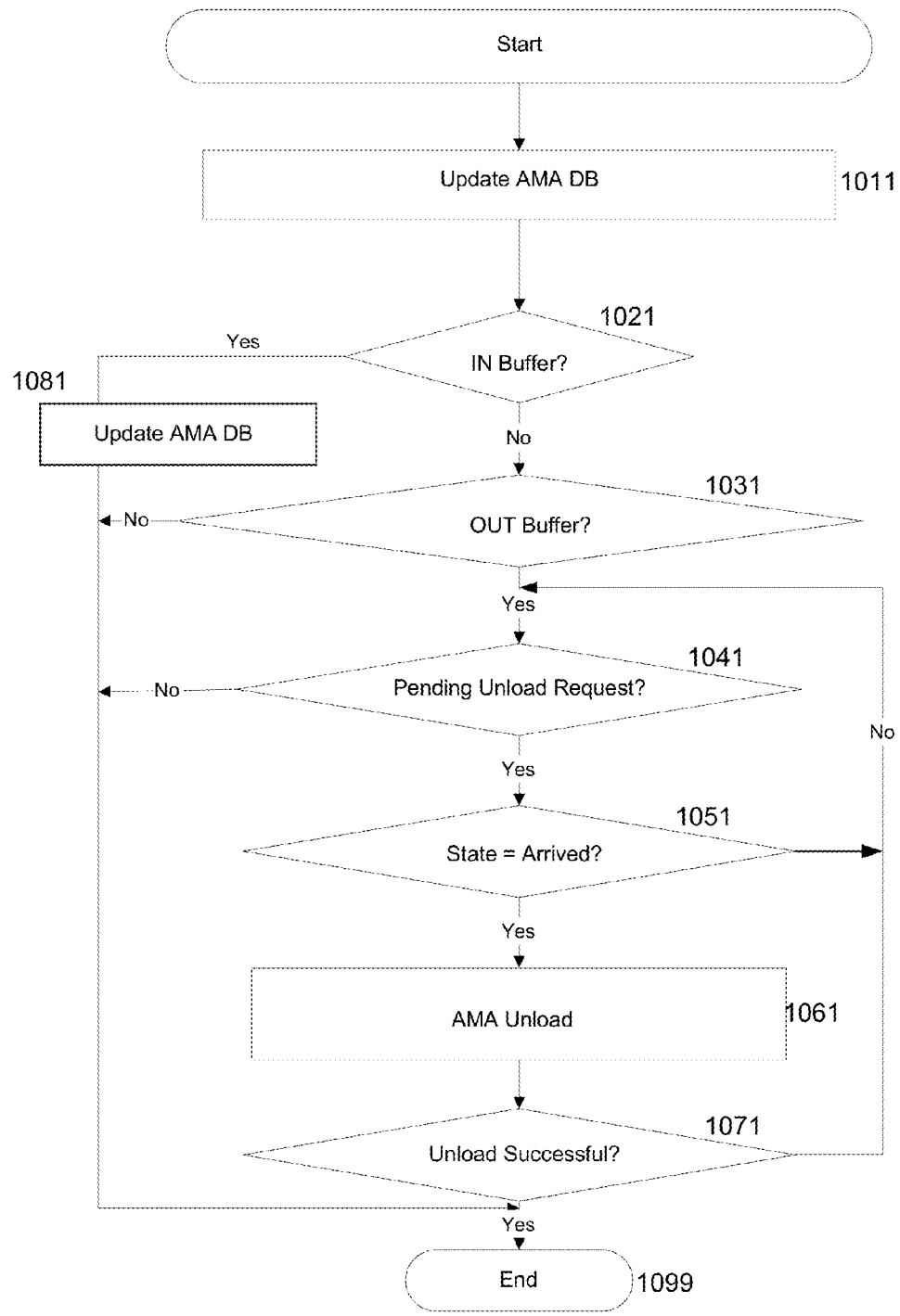

FIG. 10*d* shows an embodiment of a pod removal at WIP rack logic 1000*d* performed by the AMA module. In one embodiment, the pod removal logic is triggered when a pod is removed from a WIP rack. In one embodiment, the removal logic is triggered when a record in the Pod Request Table has the STATE field changed to REMOVED and POD_LOC is a WIP rack.

Once triggered, the AMA module updates LOT_ID to empty for the record corresponding to the pod location in POD_LOC field at step 1011. At step 1021, it determines if the tray of the WIP rack from which the pod was removed is an IN tray (IN buffer). If it is, the process proceeds to step 1081 where the record corresponding to the lot in the Reserved Lot Table is deleted, if the lot is reserved. The process then terminates at step 1099.

On the other hand, if the tray of the WIP rack is not an IN buffer, the process proceeds to step 1031. At step 1031, the AMA determines if the tray is an OUT tray (OUT buffer). If it isn't, the process terminates at step 1099. If the tray is an OUT tray, the process determines if there is a pending unload request mapped to the OUT tray at step 1041. For example, this is based on oldest request time and tool id mapped to the OUT tray. If there isn't, the process terminates at step 1099. If there is a pending unload request, the process continues to step 1051.

At step 1051, the STATE field for the pod location (POD_LOC) in the EM Request Table is checked. If the STATE field is not ARRIVED, the process returns to step 1041. If the STATE field is ARRIVED, the AMA triggers an unload function at step 1061. For example, the AMA informs the AGV manager to instruct the U/L unit to unload the pod from the tray. If an unload successful message is returned to the AMA at step 1071, the process is completed and terminates at step 1099. Otherwise, the process returns to step 1041.

Figure 10E:
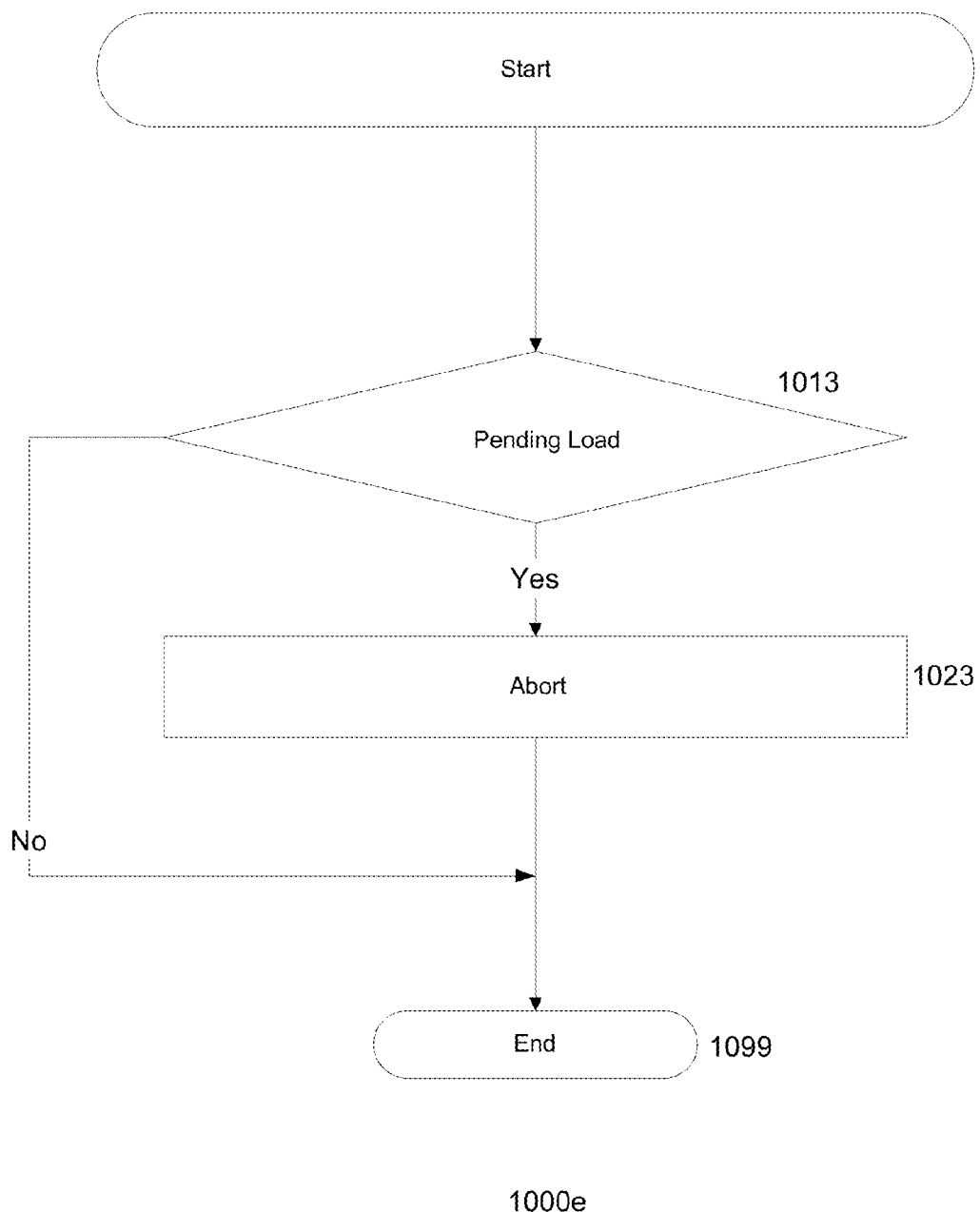

FIG. 10*e* shows an embodiment of a pod arrival at a tool logic 1000*e* performed by the AMA module. In one embodiment, the pod arrival logic is triggered when a pod has arrived. The pod arrival, for example, is due to a load request. In one embodiment, the arrival logic is triggered when a record in the Pod Request Table has the STATE field changed to ARRIVED and POD_LOC is not a WIP rack.

Once triggered, the AMA module determines if there is a pending or processing load request for this pod location at step 1013. For example, the AMA checks the AGV-AMA Table to see if there is a request for this pod location where the request time is before status update time. If no pending or processing request for this pod location is found, the process terminates at step 1099. If there is a pending or processing request, the AMA updates the status of the load request to abort at step 1023 and the process terminates at step 1099.

Figure 10F:
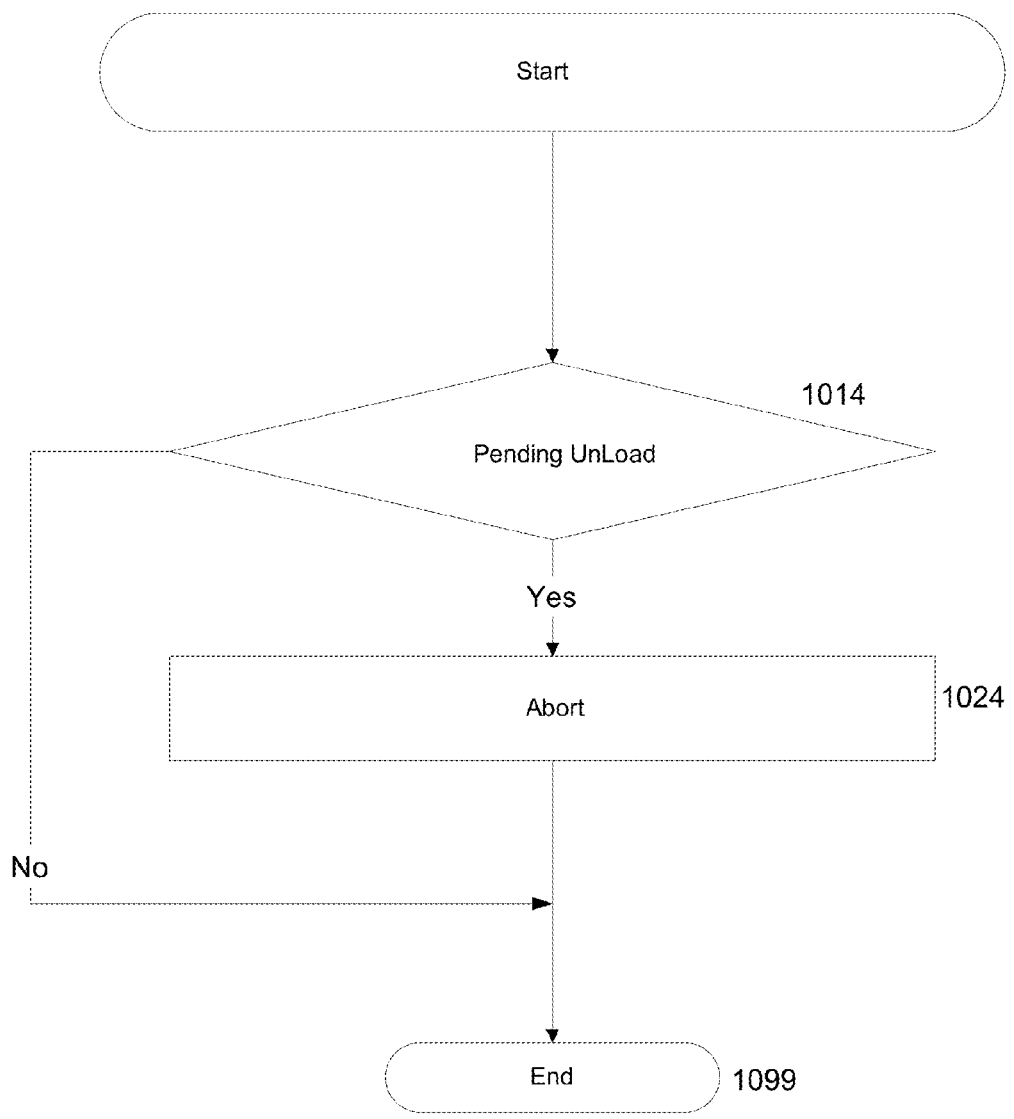

FIG. 10*f* shows an embodiment of a pod removal at a tool logic 1000*f* performed by the AMA module. In one embodiment, the pod removal logic is triggered when a pod is removed from a loader of a tool. The pod is removed, for example, due to an unload request. In one embodiment, the removal logic is triggered when a record in the Pod Request Table has the STATE field changed to REMOVED and POD_LOC is not a WIP rack.

Once triggered, the AMA module determines is there is a pending or processing unload request for this pod location at step 1014. For example, the AMA checks the AGV-AMA Table to see if there is a request for this pod location where the request time is before status update time. If no pending or processing request for this pod location is found, the process terminates at step 1099. If there is a pending or processing request, the AMA updates the status of the pending unload request to abort at step 1024 and the process terminates at step 1099.

Figure 10G:
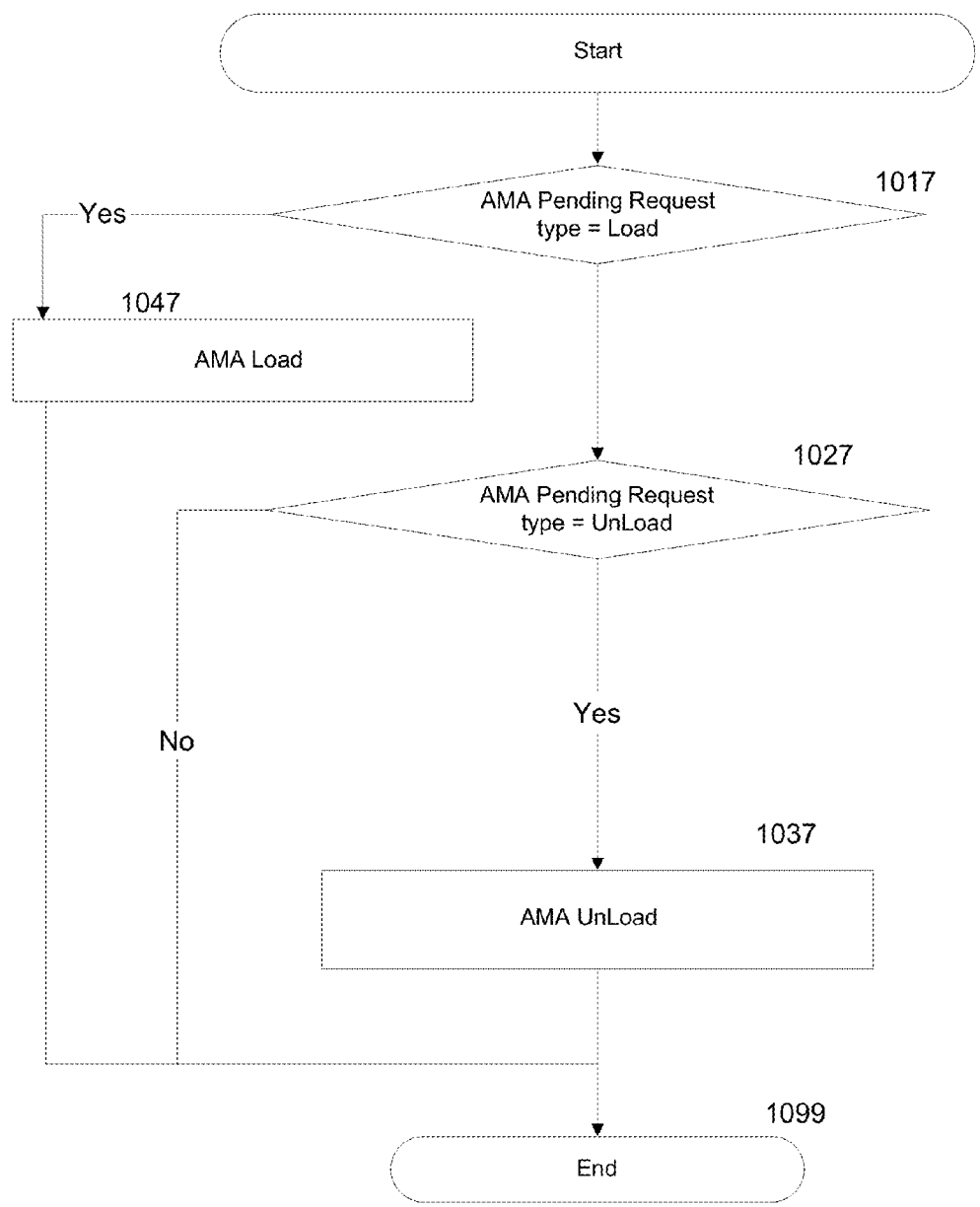

FIG. 10*g* shows an embodiment of a scheduling logic 1000*g* performed by the AMA module. In one embodiment, the scheduling logic is triggered at a predetermined time interval. For example, the scheduling logic is triggered every 5 minutes. Providing other time intervals for triggering the scheduling logic may also be useful.

The scheduling logic, when triggered, causes the AMA to determine if there is a pending load or a pending unload request at step 1017. In one embodiment, AMA determines if there is a pending load request. For example, request type=REQ_LOAD and status=AMA_Pending. If there is a pending load request, the AMA triggers a load request function at step 1047. The process then terminates at step 1099.

If no pending load request is found, the process proceeds to step 1027 to determine if there is a pending unload request. For example, request type=REQ_UNLOAD and status=AMA_Pending. If there is a pending unload request, the AMA triggers a load request function at step 1037. The process then terminates at step 1099. If no pending unload request is found, the process terminates at step 1099.

The system as described above may be embodied as one or more applications. For example, the one or more applications may be embodied as a software application. The application may be integrated into an existing software application, or as a separate stand-alone application. The existing software application may be a suite of software applications. The source code of the application may be compiled to create an executable code. The codes, for example, may be stored in a storage medium, such as one or more storage disks. Other types of storage media may also be useful.

As described, the manufacturing system can operate full auto mode. For example, in full auto mode, pods are automatically transferred from one location to another using AGV(s). Transfers may be executed based on load/unload requests automatically issued by EMs and SMs. The manufacturing system can alternatively operate in other modes. For example, the manufacturing may be configured to operate in partial auto or manual mode.

The preferred embodiment of the invention is illustrative of the invention rather than limiting of the invention. It is to be understood that revisions and modifications may be made to methods and systems described herein while still providing a manufacturing automation system and an automated method for movement of material that fall within the scope of the included claims. All matters hitherto set forth herein or shown in the accompanying figures are to be interpreted in an illustrative and non limiting sense.

What is claimed is:
1. A method for manufacturing automation comprising:
issuing a transfer request by a tool; and
processing the transfer request by a production control system configured for tracking and controlling a flow of wafer carriers used in forming semiconductor devices, the production control system includes a real time dispatcher (RTD) module comprising a dispatching lot list ranked by priority, wherein processing the transfer request comprises
selecting a carrier containing one a plurality of wafers, wherein the wafers form a lot of wafers, and
controlling a transport system comprising distinct transport units and load/unload (U/L) units in a production area to effect a transfer request from any first processing tool to any second processing tool, the distinct transport units and U/L units comprise autonomously operated automated guided vehicles (AGVs), wherein
an AGV includes a navigation system with an object detection module for autonomous operation in the production area,
a transport AGV unit includes a storage compartment for holding at least one carrier containing production material for forming a device, wherein the transport AGV unit is dedicated to transport carriers from one location to another location, and
a U/L AGV unit comprises a robotic system for automatically handling carriers, and wherein effecting the transfer from the first tool to the second tool comprises unloading a first carrier from the first tool by a selected U/L AGV unit from available U/L AGV units, loading the first carrier from the first tool by the selected U/L AGV unit onto a selected transport AGV unit from available transport AGV units for transferring the first carrier to the second tool if a distance of the second tool from the first tool is greater than a threshold distance, and transferring the first carrier from the first tool to the second tool if the distance of the second tool from the first tool is less than or equal to the threshold distance.

2. The method of claim 1 wherein:

the transfer request comprises an unload request by the first tool; and in response to the unload request, the selected U/L AGV unit unloads the first carrier from the first tool.

3. The method of claim 1 wherein the threshold distance is 240 meters.

4. The method of claim 3 wherein:

the tools of the production area each comprises an equipment manager (EM) for controlling the operation of the tool; and the production control system comprises a manufacturing execution system (MES) configured to track carrier information and status of the tool, an activity manager automation (AMA) module comprising an AMA database having tables to track information related to production facility and is configured to select the carrier and issue a dispatch request to effect the transfer, an area server module configured to receive the transfer request from the EM and update the AMA database, and an AGV manager module configured to instruct and control the transport system.

5. The method of claim 4 wherein the transfer request is an unload request and the load request is issued by the EM to the area server module, and further comprising:

updating the AMA database with the load request;

performing an unload logic which includes obtaining a dispatch lot list from a real time dispatcher (RTD) module by the AMA module; and issuing a job request to the AGV manager to transfer the first carrier to from the first tool issuing the unload request.

6. The method of claim 5 wherein when the first carrier is transferred to the second tool and comprises:

issuing a carrier state message by the EM to the area server module;

performing a validation logic by the area server module; and updating the AMA database after performing the validation logic.

7. The method of claim 4 wherein the transfer request is a load request and the load request is issued by the EM to the area server module, and further comprising:

updating the AMA database with the unload request;

performing an unload logic by the AMA module; and issuing a job request to the AGV manager to transfer the selected carrier having the processing material which the tool has completed processing from the tool issuing the unload request.

8. The method of claim 7 wherein when the first carrier is transferred out from the first tool and comprises:

issuing a carrier state message by the EM to the area server module; and updating the AMA database after issuing the carrier state message.

9. The method of claim 1 wherein the production material comprises material for forming the device or a processing material which the tool has completed processing.

10. A computer executed automated handling system for forming a device comprising:

a production control system configured for tracking and controlling a flow of wafer carriers used in forming semiconductor devices in a semiconductor production area, the production control system comprising a manufacturing execution system (MES) configured to track carrier information and status of tools of the semiconductor production area, an activity manager automation (AMA) module comprising an AMA database having tables to track information related to production facility and is configured to select a carrier and issue a dispatch request to effect a transfer of the selected carrier, a real time dispatcher (RTD) module comprising a dispatching lot list ranked by priority, an area server module configured to receive a transfer request from a requesting tool and update the AMA database, an automated guided vehicles (AGV) manager module configured to instruct and control a transport system to effect the transfer of the selected carrier between a first the requesting tool and a second tool, wherein the transport system comprises distinct transport units and load/unload (U/L) units in a production area to effect the transfer, the distinct transport units and U/L units comprise autonomously operated automated guided vehicles (AGVs), wherein an AGV includes a navigation system with an object detection module for autonomous operation in the production area, a transport AGV unit includes a storage compartment for holding at least one carrier containing production material for forming the device, wherein the transport AGV unit is dedicated to transport carriers from one location to another location, and a U/L AGV unit comprises a robotic system for automatically handling carriers, and wherein the transfer of the selected carrier between the requesting tool and the second tool comprises a selected U/L AGV unit of available U/L AGV units unloads the selected carrier from one of the requesting and second tools, the selected U/L AGV unit loads the selected carrier onto a selected transport AGV unit from available transport units for transferring the selected carrier to other of the requesting and second tools if a distance between the first and second tools is greater than a threshold distance, and the selected U/L AGV unit transfers the selected carrier by the to the other of the requesting and second tools if the distance between the requesting and second tools is less than or equal to the threshold distance.

11. The computer executed automated handling system of claim 10 further comprising:

an equipment manager (EM) for controlling operation of a tool in the production area, wherein the EM is communicatively coupled to the production control system; and the threshold distance is 240 meters.

12. The computer executed automated handling system of claim 11 wherein the EM is communicatively coupled to the area server module.

13. A method of manufacturing devices comprising:
processing a first wafer-carrier containing semiconductor wafers in a first tool, wherein the wafers form a lot of wafers;
detecting a conversion in status of the carrier to a ready to unload state;
issuing a transfer request by the first tool; and
processing the transfer request by a production control system configured for tracking and controlling a flow of wafer carriers, the production control system includes a real time dispatcher (RTD) module comprising a dispatching lot list ranked by priority, wherein processing the transfer request comprises
controlling a transport system comprising distinct transport units and load/unload (U/L) units in a production area to effect a transfer, the distinct transport units and U/L units comprise autonomously operated automated guided vehicles (AGVs), wherein
an AGV includes a navigation system with an object detection module for autonomous operation in the production area,
a transport AGV unit includes a storage compartment for holding at least one carrier containing production material for forming the devices, wherein the transport AGV unit is dedicated to transport carriers from one location to another location, and
a U/L AGV unit comprises a robotic system for automatically handling carriers, and
dispatching a selected U/L AGV unit of the transport system to unload the first carrier from the first tool, wherein
the selected U/L AGV unit loads the first carrier of the first tool onto a selected transport AGV unit dispatched to transfer the first carrier to a second tool if a distance of the second tool from the first tool is greater than a threshold distance, and
the selected U/L AGV unit transfers the first carrier of the first tool to a second tool if the distance of the second tool from the first tool is less than or equal to the threshold distance.

14. The method of claim 13 wherein the transfer request is an unload request and comprising:
updating a database with the unload request;
performing an unload logic; and
issuing a job request to transfer the carrier containing the production material which the tool has completed processing from the tool issuing the unload request.

15. The method of claim 14 wherein when the carrier is transferred out from the tool, the method comprising:
issuing a carrier state message; and
updating the database after issuing the carrier state message.

16. The method of claim 13 wherein the threshold distance is 240 meters.

17. A non-transitory computer readable medium having stored thereon program code, the program code executable by a computer for manufacturing automation comprising:
receiving a transfer request by a first tool in a semiconductor production area; and
processing the transfer request by a production control system which includes a real time dispatcher (RTD) module comprising a dispatching lot list ranked by priority, wherein processing the transfer request comprises
selecting a carrier (selected carrier) containing wafers, wherein the wafers form a lot of wafers,
controlling a transport system comprising distinct transport units and load/unload (U/L) units in a production area to effect a transfer between the first tool and a second tool, the distinct transport units and U/L units comprise autonomously operated automated guided vehicles (AGVs), wherein
an AGV includes a navigation system with an object detection module for autonomous operation in the production area,
a transport AGV unit includes a storage compartment for holding at least one carrier containing production material for forming a device, wherein the transport AGV unit is dedicated to transport carriers from one location to another location, and
a U/L AGV unit comprises a robotic system for automatically handling carriers, and
transferring the selected carrier by the transport system between the first tool and the second tool comprising
unloading the selected carrier from one of the first and second tools using a selected U/L AGV unit of available U/L AGV units,
loading the selected carrier onto a selected transport AGV unit from available transport units for transferring the selected carrier to other of the first and second tools if a distance between the first and second tools is greater than a threshold distance, and
transferring the selected carrier by the selected U/L AGV unit to the other of the first and second tools if the distance between the first and second tools is less than or equal to the threshold distance.

* * * * *